US012633550B2

(12) United States Patent
Moriyama et al.

(10) Patent No.: US 12,633,550 B2
(45) Date of Patent: May 19, 2026

(54) FUEL CELL POWER PLANT HEAT EXCHANGER

(71) Applicant: Honda Motor Co., Ltd., Tokyo (JP)

(72) Inventors: Koji Moriyama, Rancho Palos Verdes, CA (US); Richard Y. Asato, Torrance, CA (US); Ryosuke Shibata, Saitama (JP); Brian Moran, Lake Forest, CA (US)

(73) Assignee: Honda Motor Co., Ltd., Tokyo (JP)

( * ) Notice: Subject to any disclaimer, the term of this patent is extended or adjusted under 35 U.S.C. 154(b) by 805 days.

(21) Appl. No.: 18/087,562

(22) Filed: Dec. 22, 2022

(65) Prior Publication Data

US 2023/0282845 A1 Sep. 7, 2023

Related U.S. Application Data

(60) Provisional application No. 63/317,190, filed on Mar. 7, 2022.

(51) Int. Cl.
*H01M 8/04007* (2016.01)
*H01M 8/0258* (2016.01)
(Continued)

(52) U.S. Cl.
CPC ....... *H01M 8/0267* (2013.01); *H01M 8/0258* (2013.01); *H01M 8/04014* (2013.01); *H01M 8/04029* (2013.01); *H01M 8/04067* (2013.01); *H01M 8/04074* (2013.01); *H01M 8/043* (2016.02); *H01M 8/0432* (2013.01); (Continued)

(58) Field of Classification Search
CPC ............... H01M 8/0267; H01M 8/043; H01M 8/04014; H01M 8/04029; H01M 8/0258; H01M 8/04067; H01M 8/04074; H01M 8/0432; H01M 8/04873; H01M 8/0488; H01M 8/2475; H01M 8/04701; H01M 8/04992; H01M 8/2495; H01M 8/249; H01M 2250/20
See application file for complete search history.

(56) References Cited

U.S. PATENT DOCUMENTS 6,387,556 B1 5/2002 Fuglevand et al.
7,166,985 B1 1/2007 Arikara et al.
(Continued)

FOREIGN PATENT DOCUMENTS

CN 108700486 10/2018
JP 200501386 A 1/2005
(Continued)

OTHER PUBLICATIONS

Office Action of U.S. Appl. No. 18/087,389 dated Jun. 2, 2025, 29 pages.

(Continued)

*Primary Examiner* — Christopher P Domone
(74) *Attorney, Agent, or Firm* — Rankin, Hill & Clark LLP

(57) ABSTRACT

A heat exchanger for a fuel cell power plant system may include a first loop and a second loop. For the first loop, a first coolant may be passed through a fuel cell stack, a thermostat, a first portion of a first plate of the heat exchanger, and a fuel cell pump. For the second loop, a second coolant may be passed through a second portion of the first plate of the heat exchanger.

6 Claims, 26 Drawing Sheets

(51) Int. Cl.

| | |
|---|---|
| *H01M 8/0267* | (2016.01) |
| *H01M 8/04014* | (2016.01) |
| *H01M 8/04029* | (2016.01) |
| *H01M 8/043* | (2016.01) |
| *H01M 8/0432* | (2016.01) |
| *H01M 8/04858* | (2016.01) |
| *H01M 8/2475* | (2016.01) |
| *H01M 8/2495* | (2016.01) |

(52) U.S. Cl.

CPC ....... *H01M 8/0488* (2013.01); *H01M 8/2475* (2013.01); *H01M 8/2495* (2013.01); *H01M 2250/20* (2013.01)

(56) References Cited

U.S. PATENT DOCUMENTS

| | | | |
|---|---|---|---|
| 7,731,491 | B2 | 6/2010 | Mann et al. |
| 7,914,945 | B2 | 3/2011 | Dunn et al. |
| 8,469,135 | B2 | 6/2013 | Kaschner |
| 8,501,359 | B2 | 8/2013 | Shimoi et al. |
| 9,034,533 | B2 | 5/2015 | Yi et al. |
| 10,644,332 | B2 | 5/2020 | Okamura et al. |
| 11,043,688 | B2 | 6/2021 | Ballantine et al. |
| 2003/0118883 | A1 | 6/2003 | Breault et al. |
| 2004/0062975 | A1 | 4/2004 | Yamamoto et al. |
| 2004/0062977 | A1 | 4/2004 | Yazici et al. |
| 2004/0062978 | A1 | 4/2004 | Yazici |
| 2004/0083039 | A1 | 4/2004 | Hunt et al. |
| 2004/0110044 | A1 | 6/2004 | McArthur et al. |
| 2006/0086074 | A1 | 4/2006 | Kasuya et al. |
| 2007/0087239 | A1 | 4/2007 | Mulvenna et al. |
| 2010/0183936 | A1 | 7/2010 | Osborne et al. |
| 2010/0273079 | A1 | 10/2010 | Hinsenkamp et al. |
| 2012/0253552 | A1 | 10/2012 | Skelton |
| 2014/0089055 | A1 | 3/2014 | Smith et al. |
| 2016/0129780 | A1 | 5/2016 | McAlister |
| 2016/0359180 | A1 | 12/2016 | Adcock |
| 2017/0012309 | A1 | 1/2017 | Venkat et al. |
| 2017/0214069 | A1 | 7/2017 | Hoshi |
| 2018/0345924 | A1 | 12/2018 | Berels |
| 2019/0081335 | A1 | 3/2019 | Shinozaki |
| 2019/0128570 | A1* | 5/2019 | Moxon ............. H01M 10/6556 |
| 2019/0143839 | A1 | 5/2019 | Kitamoto et al. |
| 2019/0190053 | A1 | 6/2019 | Ballantine et al. |
| 2021/0098806 | A1 | 4/2021 | Sakai et al. |
| 2021/0359623 | A1 | 11/2021 | Pmsvvsv et al. |
| 2023/0010307 | A1 | 1/2023 | Zhou et al. |
| 2023/0104670 | A1* | 4/2023 | Mothier ............ H01M 8/04358 |
| | | | 429/437 |
| 2024/0266865 | A1 | 8/2024 | Crossley et al. |

FOREIGN PATENT DOCUMENTS

| | | |
|---|---|---|
| KR | 20210124723 | 10/2021 |
| WO | WO2005069839 A2 | 8/2005 |
| WO | WO2015143080 | 9/2015 |
| WO | WO2016044835 | 3/2016 |
| WO | WO2020203059 A1 | 10/2020 |

OTHER PUBLICATIONS

Office Action of U.S. Appl. No. 18/087,444 dated Jun. 24, 2025, 19 pages.

Office Action of U.S. Appl. No. 18/087,541 dated Jun. 13, 2025, 30 pages.

International Search Report and Written Opinion of PCT/US2023/013154 dated Aug. 29, 2023, 17 pages.

Office Action of U.S. Appl. No. 18/087,389 dated Oct. 14, 2025, 29 pages.

Office Action of U.S. Appl. No. 18/087,444 dated Oct. 20, 2025, 17 pages.

Office Action of U.S. Appl. No. 18/087,541 dated Oct. 24, 2025, 26 pages.

Office Action of U.S. Appl. No. 18/087,444 dated Feb. 2, 2026, 18 pages.

Office Action of U.S. Appl. No. 18/087,497 dated Jan. 8, 2026, 28 pages.

Office Action of U.S. Appl. No. 18/087,541 dated Jan. 21, 2026, 22 pages.

* cited by examiner

Q1 = QUAD 1
Q2 = QUAD 2
Q3 = QUAD 3
Q4 = QUAD 4
IVT = SHUNT CURRENT VOLTAGE TEMP

EHV = ENGINE HIGH VOLTAGE DISTRIBUTION
QHV = QUAD HIGH VOLTAGE DISTRIBUTION
PHV = PLANT HIGH VOLTAGE DISTRIBUTION

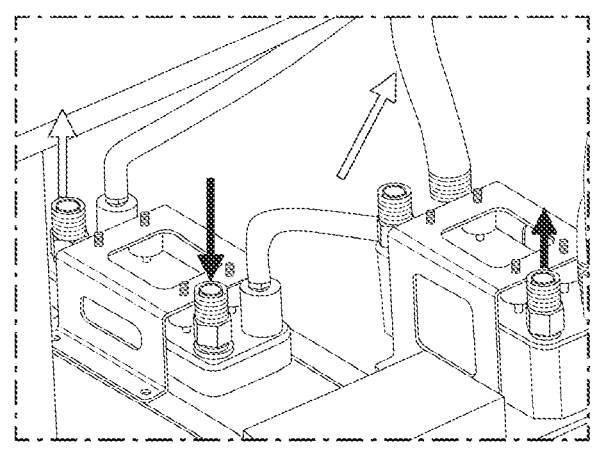
FIG. 11A
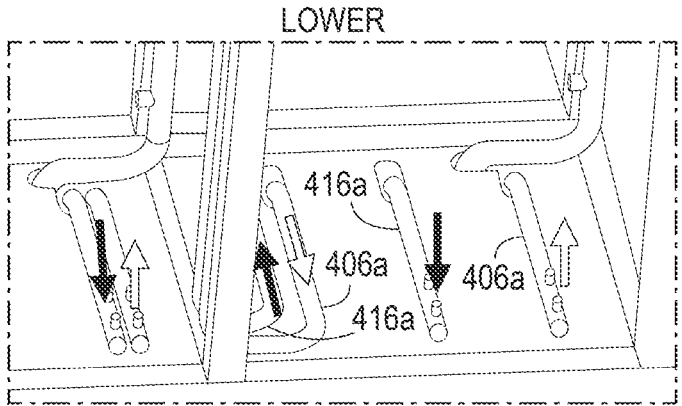
FIG. 11B
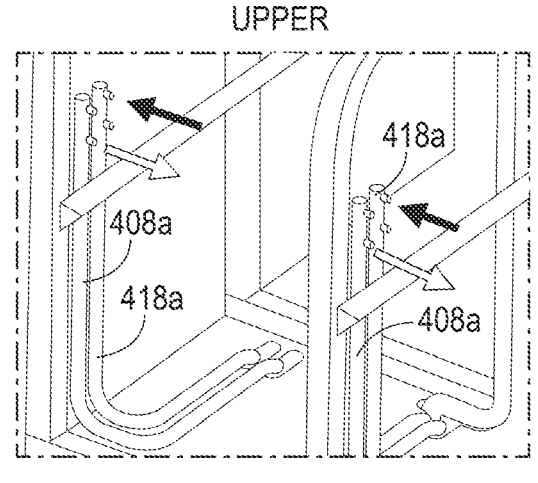
FIG. 11C
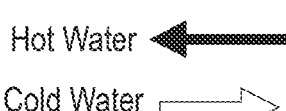

1500

1502

Controlling mode of operation of a fuel cell power plant to be in a run operation mode, standby mode, or emergency stopped mode

1504

Monitoring two or more power units of fuel cell power plant for fault conditions, alarms, or amount of energy produced

1506

Enabling an override operation of corresponding fuel cell system for the fuel cell power plant

1700

FUEL CELL POWER PLANT HEAT EXCHANGER

CROSS-REFERENCE TO RELATED APPLICATIONS

This application claims the benefit of U.S. Provisional Patent Application, Ser. No. 63/317,190 entitled "FUEL CELL POWER PLANT", filed on Mar. 7, 2022; the entirety of the above-noted application(s) is incorporated by reference herein.

BACKGROUND

A fuel cell is an electrochemical cell that converts the chemical energy of a fuel, such as hydrogen, and an oxidizing agent, such as oxygen, into electricity through a pair of redox reactions. Fuel cells are different from most batteries in that they generally require a continuous source of fuel and oxygen to sustain a chemical reaction, whereas in a battery the chemical energy usually comes from metals and their ions or oxides that are commonly already present in the battery, except in flow batteries. Fuel cells may produce electricity continuously for as long as fuel and oxygen are supplied.

BRIEF DESCRIPTION

According to one aspect, a fuel cell power plant system may include two or more power units and a fuel cell power plant controller. The two or more power units may be electrically connected and/or connected in parallel. Each one of the two or more power units may include two or more fuel cell systems. The fuel cell power plant controller may be electrically connected to the two or more power units and may include a user control circuitry and a monitoring circuitry. The user control circuitry may control a mode of operation of the fuel cell power plant system to be run in an operation mode, a standby mode, a maintenance mode, or an emergency stopped mode. The monitoring circuitry may monitor the two or more power units of the fuel cell power plant system for one or more fault conditions, one or more alarms, or an amount of energy produced.

One or more of the fuel cell systems may be repurposed from vehicle fuel cells. One or more of the fuel cell systems may be hydrogen fuel cell systems. One or more of the fuel cell systems may include a fuel cell stack, a battery, an air pump, a DC-DC converter, and a fuel cell voltage converter unit (FCVCU). The fuel cell power plant system may include two or more platforms for the two or more power units. One or more cooling lines, one or more electrical connections, and one or more fuel lines may extend through the two or more platforms and may supply cooling, electrical connections, and fuel to the two or more power units.

One of the two or more fuel cell systems may include a gateway control circuitry controlling engine high voltage (EHV) associated with the corresponding fuel cell system. A first fuel cell system of the two or more fuel cell systems may include a major gateway control circuitry monitoring a water temperature, a fuel leak sensor, or a smoke sensor associated with the corresponding power unit. Each of the two or more fuel cell systems may include a management electronic control unit (ECU) issuing a command to the corresponding fuel cell system. The command may be a vehicle stability management (VSM) override operation, or an immobilizer override operation. The two or more power units may output power to a grid inverter.

According to one aspect, a fuel cell power plant controller may include a user control circuitry and a monitoring circuitry. The user control circuitry may control a mode of operation of a fuel cell power plant system to be run in an operation mode, a standby mode, a maintenance mode, or an emergency stopped mode. The monitoring circuitry may monitor two or more power units of the fuel cell power plant system for one or more fault conditions, one or more alarms, or an amount of energy produced. The two or more power units may be electrically connected. The two or more power units may be electrically connected to the fuel cell power plant controller. Each one of the two or more power units may include two or more fuel cell systems which may be connected in parallel.

One or more of the fuel cell systems may be repurposed from vehicle fuel cells. One or more of the fuel cell systems may be hydrogen fuel cell systems. One or more of the fuel cell systems may include a fuel cell stack, a battery, an air pump, a DC-DC converter, and a fuel cell voltage converter unit (FCVCU). The fuel cell power plant controller may include two or more platforms for the two or more power units. One or more cooling lines, one or more electrical connections, and one or more fuel lines may extend through the two or more platforms and supply cooling, electrical connections, and fuel to the two or more power units. One of the two or more fuel cell systems may include gateway control circuitry controlling engine high voltage (EHV) associated with the corresponding fuel cell system.

According to one aspect, a fuel cell power plant system may include two or more power units and a fuel cell power plant controller. The two or more power units may be electrically connected and/or connected in parallel. Each one of the two or more power units may include two or more fuel cell systems repurposed from vehicle fuel cells. The two or more fuel cell systems may be connected in parallel. The fuel cell power plant controller may be electrically connected to the two or more power units and may include a user control circuitry and a monitoring circuitry. The user control circuitry may control a mode of operation of the fuel cell power plant system to be run in an operation mode, a standby mode, a maintenance mode, or an emergency stopped mode. The monitoring circuitry may monitor the two or more power units of the fuel cell power plant system for one or more fault conditions, one or more alarms, or an amount of energy produced.

One or more of the fuel cell systems may be hydrogen fuel cell systems. One or more of the fuel cell systems may include a fuel cell stack, a battery, an air pump, a DC-DC converter, and a fuel cell voltage converter unit (FCVCU). The fuel cell power plant system may include two or more platforms for the two or more power units. One or more cooling lines, one or more electrical connections, and one or more fuel lines may extend through the two or more platforms and supply cooling, electrical connections, and fuel to the two or more power units.

According to one aspect, a fuel cell power plant cooling system may include a power unit coolant supply line, two or more fuel cell system coolant supply lines, two or more fuel cell systems, two or more fuel cell system return supply lines, and a power unit return supply line. The power unit coolant supply line may be configured to receive a coolant. The two or more fuel cell system coolant supply lines may be connected to the power unit coolant supply line and may be configured to receive coolant from the power unit coolant supply line. The two or more fuel cell systems may be configured to be cooled by the two or more fuel cell system coolant supply lines, respectively. The two or more fuel cell system return supply lines may be connected to the two or more fuel cell system coolant supply lines, respectively, and may be configured to receive coolant from the two or more fuel cell system coolant supply lines. The power unit return supply line may be connected to the two or more fuel cell system return supply lines and may be configured to receive coolant from the two or more fuel cell system return supply lines, respectively.

An end of the power unit coolant supply line may be capped. An end of the power unit return supply line may be capped. An end of the power unit coolant supply line may be connected to a power unit coolant supply line of a second fuel cell power plant cooling system. An end of the power unit return supply line may be connected to a power unit return supply line of a second fuel cell power plant cooling system. The coolant may be water. The fuel cell power plant cooling system may include two or more slidable fuel cell system skids which may accommodate the two or more fuel cell systems, respectively. The fuel cell power plant cooling system may include two or more fuel cell system exhaust lines which may be connected to a condensate drain line and may be configured to expel exhaust from the power unit coolant supply line. The two or more fuel cell system exhaust lines may be oriented in a vertical direction relative to a ground plane. The two or more fuel cell system coolant supply lines may be oriented in a vertical direction relative to a ground plane.

According to one aspect, a fuel cell power plant cooling structure may include a power unit coolant supply line, two or more fuel cell system coolant supply lines, two or more fuel cell systems, two or more fuel cell system return supply lines, and a power unit return supply line. The power unit coolant supply line may be configured to receive a coolant. The two or more fuel cell system coolant supply lines may be connected to the power unit coolant supply line and may be configured to receive coolant from the power unit coolant supply line. The two or more fuel cell systems may be configured to be cooled by the two or more fuel cell system coolant supply lines, respectively. The two or more fuel cell system return supply lines may be connected to the two or more fuel cell system coolant supply lines, respectively, and may be configured to receive coolant from the two or more fuel cell system coolant supply lines. The power unit return supply line may be connected to the two or more fuel cell system return supply lines and may be configured to receive coolant from the two or more fuel cell system return supply lines, respectively.

An end of the power unit coolant supply line may be capped. An end of the power unit return supply line may be capped. An end of the power unit coolant supply line may be connected to a power unit coolant supply line of a second fuel cell power plant cooling structure. An end of the power unit return supply line may be connected to a power unit return supply line of a second fuel cell power plant cooling structure. The coolant may be water. The fuel cell power plant cooling structure may include two or more slidable fuel cell system skids which may accommodate the two or more fuel cell systems, respectively. The fuel cell power plant cooling structure may include two or more fuel cell system exhaust lines which may be connected to a condensate drain line and may be configured to expel exhaust from the power unit coolant supply line. The two or more fuel cell system exhaust lines may be oriented in a vertical direction relative to a ground plane. The two or more fuel cell system coolant supply lines may be oriented in a vertical direction relative to a ground plane.

According to one aspect, a fuel cell power plant cooling structure may include a first fuel cell power plant cooling system and a second fuel cell power plant cooling system. The first fuel cell power plant cooling system may include a power unit coolant supply line, two or more fuel cell system coolant supply lines, two or more fuel cell systems, two or more fuel cell system return supply lines, and a power unit return supply line. The power unit coolant supply line may be configured to receive a coolant. The two or more fuel cell system coolant supply lines may be connected to the power unit coolant supply line and may be configured to receive coolant from the power unit coolant supply line. The two or more fuel cell systems may be configured to be cooled by the two or more fuel cell system coolant supply lines, respectively. The two or more fuel cell system return supply lines may be connected to the two or more fuel cell system coolant supply lines, respectively, and may be configured to receive used coolant from the two or more fuel cell system coolant supply lines. The power unit return supply line may be connected to the two or more fuel cell system return supply lines and may be configured to receive used coolant from the two or more fuel cell system return supply lines, respectively. The second fuel cell power plant cooling system may include a second power unit coolant supply line which may be configured to receive the coolant from the power unit coolant supply line.

An end of the second power unit coolant supply line may be capped. The second fuel cell power plant cooling system may include a second power unit return supply line which may be configured to receive the used coolant from the power unit return supply line. An end of the second power unit return supply line may be capped.

According to one aspect, a fuel cell power plant system may include a fuel supply line, two or more fuel cell system fuel supply lines, and two or more power units. The fuel supply line may be configured to receive fuel. The two or more fuel cell system fuel supply lines may be connected to the fuel supply line and may be configured to receive fuel from the fuel supply line. The two or more power units may be configured to be fueled by the two or more fuel cell system fuel supply lines, respectively.

Each one of the two or more power units may include two or more fuel cell systems. One or more of the fuel cell systems may be repurposed from vehicle fuel cells. One or more of the fuel cell systems include a fuel cell stack, a battery, an air pump, a DC-DC converter, and a fuel cell voltage converter unit (FCVCU). An end of the fuel supply line may be capped. An end of the fuel supply line may be connected to a fuel supply line of a second fuel cell power plant cooling system. The fuel may be hydrogen.

According to one aspect, a fuel cell power plant structure may include a fuel supply line, two or more fuel cell system fuel supply lines, and two or more power units. The fuel supply line may be configured to receive fuel. The two or more fuel cell system fuel supply lines may be connected to the fuel supply line and may be configured to receive fuel from the fuel supply line. The two or more power units may be configured to be fueled by the two or more fuel cell system fuel supply lines, respectively.

Each one of the two or more power units may include two or more fuel cell systems. One or more of the fuel cell systems may be repurposed from vehicle fuel cells. One or more of the fuel cell systems include a fuel cell stack, a battery, an air pump, a DC-DC converter, and a fuel cell voltage converter unit (FCVCU). An end of the fuel supply line may be capped. An end of the fuel supply line may be connected to a fuel supply line of a second fuel cell power plant cooling system. The fuel may be hydrogen.

According to one aspect, a fuel cell power plant system may include a fuel supply line, a first fuel cell system fuel supply line, a second fuel cell system fuel supply line, a first power unit, and a second power unit. The fuel supply line may be configured to receive fuel. The first fuel cell system fuel supply line may be connected to the fuel supply line and may be configured to receive fuel from the fuel supply line. The second fuel cell system fuel supply line may be connected to the fuel supply line and may be configured to receive fuel from the fuel supply line. The first power unit may be configured to be fueled by the first fuel cell system fuel supply line. The second power unit may be configured to be fueled by the second fuel cell system fuel supply line.

Each one of the first power unit and the second power unit may include two or more fuel cell systems. One or more of the fuel cell systems may be repurposed from vehicle fuel cells. One or more of the fuel cell systems include a fuel cell stack, a battery, an air pump, a DC-DC converter, and a fuel cell voltage converter unit (FCVCU). An end of the fuel supply line may be capped. An end of the fuel supply line may be connected to a fuel supply line of a second fuel cell power plant cooling system.

According to one aspect, a fuel cell power plant system may include two or more electrically connected power units, two or more voltage channels, and a fuel cell power plant controller. Each one of the two or more power units may include two or more fuel cell systems. The two or more voltage channels may be respectively connected to the two or more power units. The fuel cell power plant controller may be electrically connected to the two or more power units.

One or more of the fuel cell systems may be repurposed from vehicle fuel cells. One or more of the fuel cell systems may be hydrogen fuel cell systems. One or more of the fuel cell systems include a fuel cell stack, a battery, an air pump, a DC-DC converter, and a fuel cell voltage converter unit (FCVCU). The fuel cell power plant system may include two or more platforms for the two or more power units, one or more cooling lines, one or more electrical connections, and one or more fuel lines extend through the two or more platforms and supply cooling, electrical connections, and fuel to the two or more power units. One of the two or more fuel cell systems may include a gateway control circuitry controlling engine high voltage (EHV) associated with the corresponding fuel cell system. A first fuel cell system of the two or more fuel cell systems may include a major gateway control circuitry monitoring a water temperature, a fuel leak sensor, or a smoke sensor associated with the corresponding power unit. Each of the two or more fuel cell systems may include a management electronic control unit (ECU) issuing a command to the corresponding fuel cell system. The command may be a vehicle stability management (VSM) override operation or an immobilizer override operation. The two or more power units may output power to a grid inverter.

According to one aspect, a fuel cell power plant system may include a first power unit, a second power unit, a first voltage channel, a second voltage channel, and a fuel cell power plant controller. The first power unit may include two or more fuel cell systems. The second power unit may include two or more fuel cell systems and may be electrically connected to the first power unit. The first voltage channel may be connected to the first power unit. The second voltage channel may be connected to the second power unit.

The fuel cell power plant controller may be electrically connected to the first power unit and the second power unit.

One or more of the fuel cell systems may be repurposed from vehicle fuel cells. One or more of the fuel cell systems may be hydrogen fuel cell systems. One or more of the fuel cell systems include a fuel cell stack, a battery, an air pump, a DC-DC converter, and a fuel cell voltage converter unit (FCVCU).

According to one aspect, a fuel cell power plant system may include two or more electrically connected power units, two or more voltage channels, and a fuel cell power plant controller. Each one of the two or more power units may include two or more fuel cell systems, but less than eight fuel cell systems. The two or more voltage channels may be respectively connected to the two or more power units. The fuel cell power plant controller may be electrically connected to the two or more power units.

One or more of the fuel cell systems may be repurposed from vehicle fuel cells. One or more of the fuel cell systems may be hydrogen fuel cell systems. One or more of the fuel cell systems include a fuel cell stack, a battery, an air pump, a DC-DC converter, and a fuel cell voltage converter unit (FCVCU). The fuel cell power plant system may include two or more platforms for the two or more power units, one or more cooling lines, one or more electrical connections, and one or more fuel lines extend through the two or more platforms and supply cooling, electrical connections, and fuel to the two or more power units. One of the two or more fuel cell systems may include a gateway control circuitry controlling engine high voltage (EHV) associated with the corresponding fuel cell system.

According to one aspect, a heat exchanger for a fuel cell power plant system may include a first loop and a second loop. For the first loop, a first coolant may be passed through a fuel cell stack, a thermostat, a first portion of a first plate of the heat exchanger, and a fuel cell pump. For the second loop, a second coolant may be passed through a second portion of the first plate of the heat exchanger.

The second coolant may be received from an external source. The heat exchanger for the fuel cell power plant system may include a third loop. For the third loop, a third coolant may be passed through an area associated with circuitry, the fuel cell stack, an expansion tank, and a first portion of a second plate of the heat exchanger. The heat exchanger for the fuel cell power plant system may include a fourth loop. For the fourth loop, the second coolant may be passed through a second portion of the second plate of the heat exchanger. The first plate may have a greater size than the second plate of the heat exchanger. The first coolant or the second coolant may be water.

The thermostat may regulate a path of the first loop. If a temperature of the first coolant is above a threshold, the first loop may include the first portion of the first plate of the heat exchanger. If a temperature of the first coolant is below a threshold, the first loop may not include the first portion of the first plate of the heat exchanger. The heat exchanger for the fuel cell power plant system may include a fuel cell system coolant supply line receiving the second coolant.

According to one aspect, a heat exchanger for a fuel cell power plant system may include a first loop, a second loop, and a third loop. For the first loop, a first coolant may be passed through a fuel cell stack, a thermostat, a first portion of a first plate of the heat exchanger, and a fuel cell pump. For the second loop, a second coolant may be passed through a second portion of the first plate of the heat exchanger. For the third loop, a third coolant may be passed through an area associated with circuitry, the fuel cell stack, an expansion tank, and a first portion of a second plate of the heat exchanger.

The heat exchanger for the fuel cell power plant system may include a fourth loop, the second coolant may be passed through a second portion of the second plate of the heat exchanger. The first plate may have a greater size than the second plate of the heat exchanger. The first coolant or the second coolant may be water. The thermostat may regulate a path of the first loop. If a temperature of the first coolant is above a threshold, the first loop may include the first portion of the first plate of the heat exchanger.

According to one aspect, a heat exchanger for a fuel cell power plant system may include a first loop and a second loop. For the first loop, a first coolant may be passed through a fuel cell stack, a thermostat regulating a path of the first loop based on a temperature of the first coolant, a first portion of a first plate of the heat exchanger, and a fuel cell pump. For the second loop, a second coolant may be passed through a second portion of the first plate of the heat exchanger.

The second coolant may be received from an external source. The heat exchanger for the fuel cell power plant system may include a third loop. For the third loop, a third coolant may be passed through an area associated with circuitry, the fuel cell stack, an expansion tank, and a first portion of a second plate of the heat exchanger. The heat exchanger for the fuel cell power plant system may include a fourth loop. For the fourth loop, the second coolant may be passed through a second portion of the second plate of the heat exchanger.

BRIEF DESCRIPTION OF THE DRAWINGS

FIGS. 11A-11D are exemplary schematic diagrams of quad-level cooling for a fuel cell power plant cooling system, according to one aspect.

DETAILED DESCRIPTION

Figure 1A:
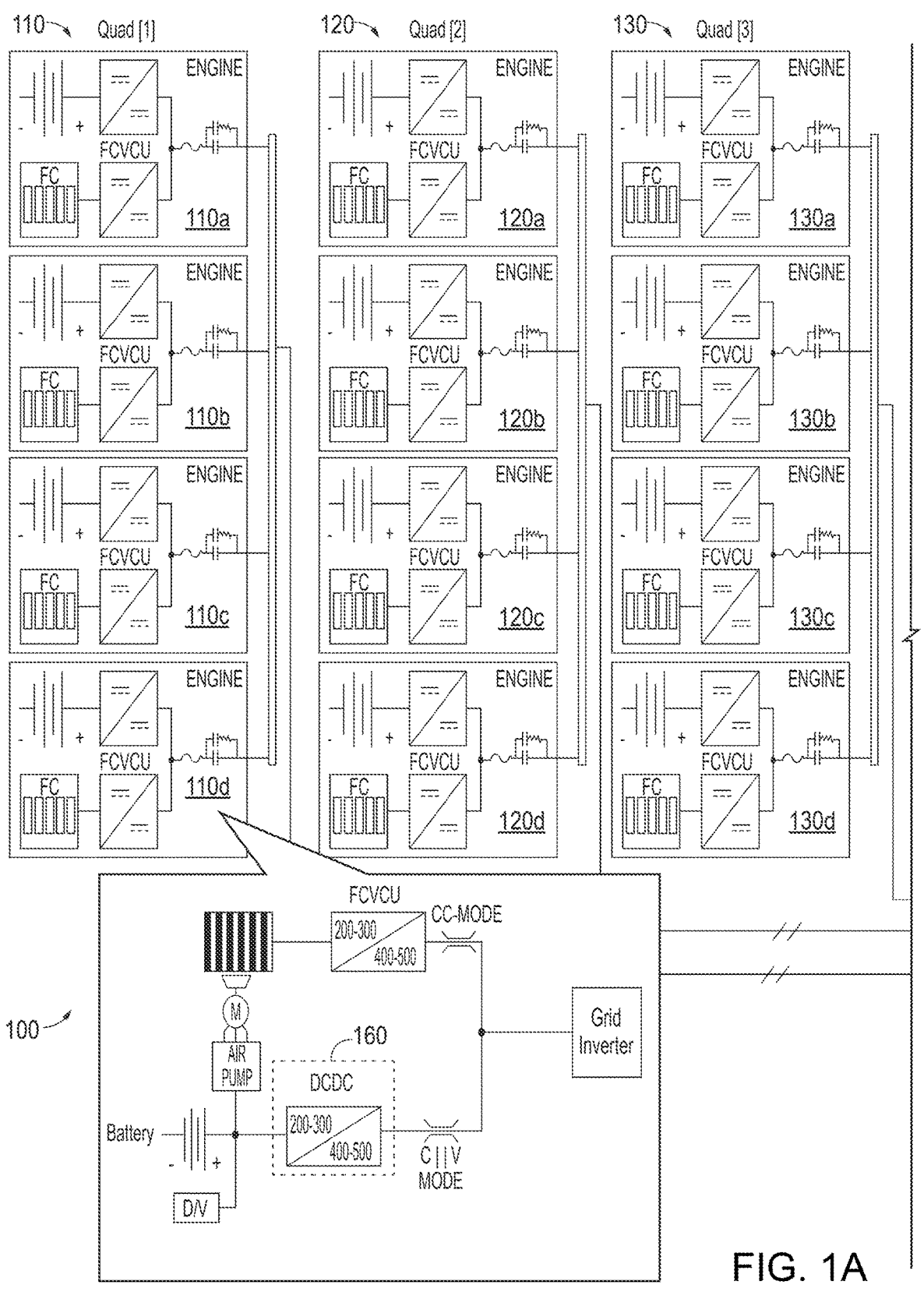
FIGS. 1A-1C are exemplary schematic diagrams of a fuel cell power plant system, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), Modbus, among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Figure 1B:
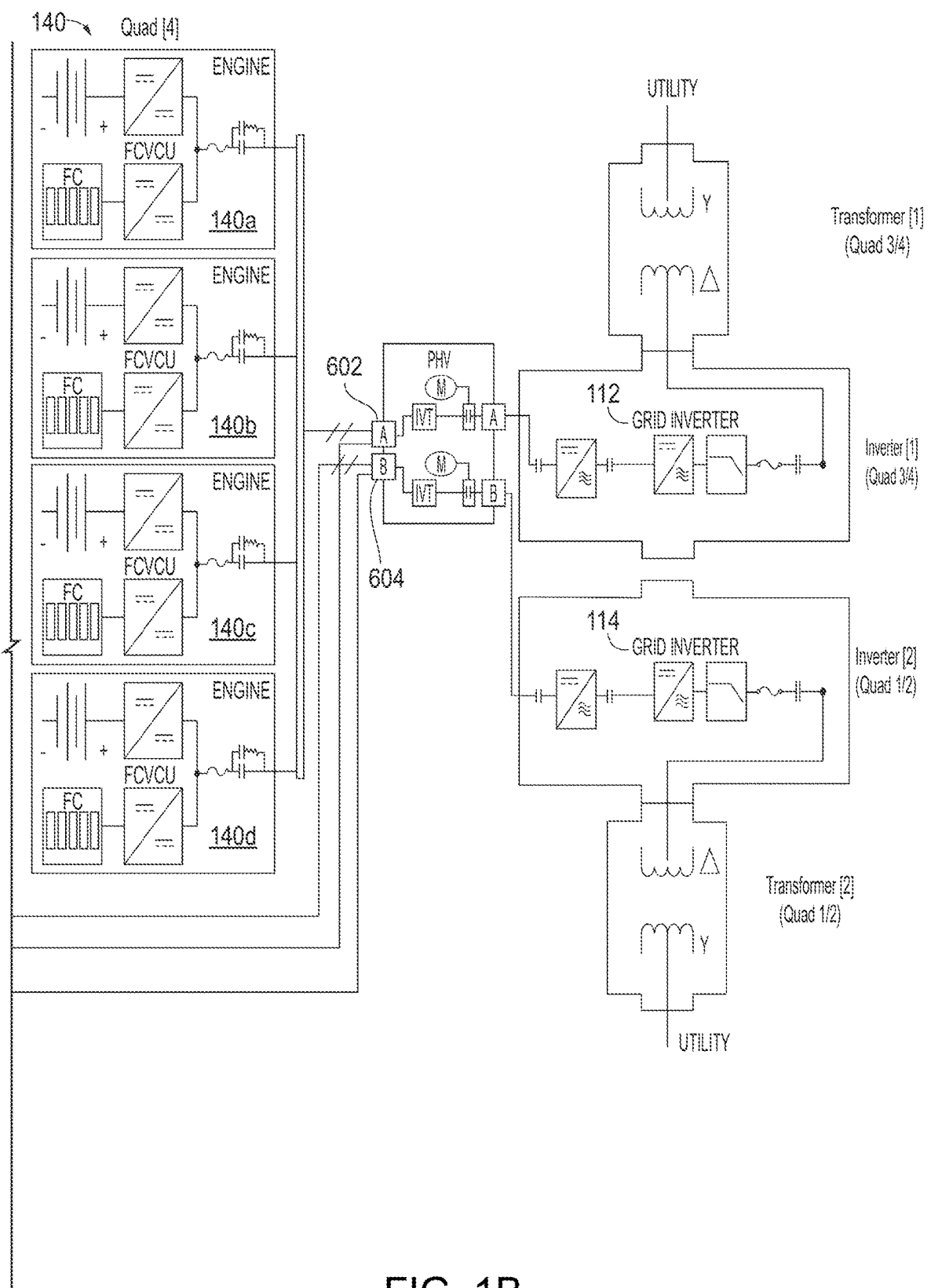
Figure 1C:
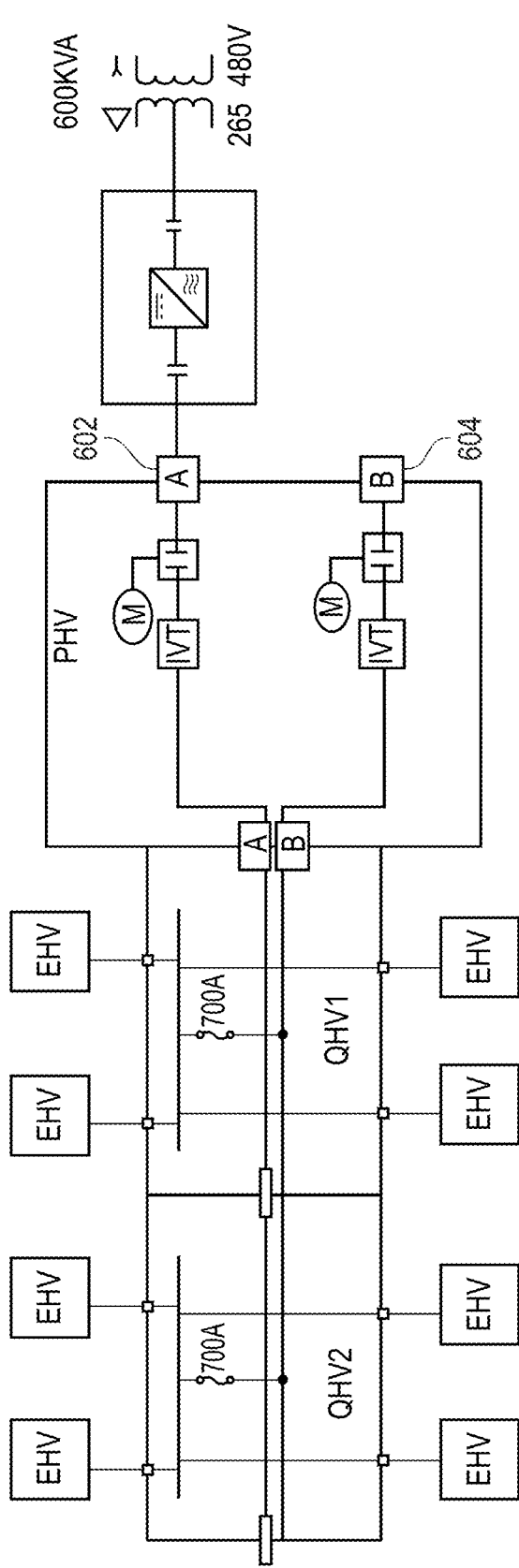

FIGS. 1A-1C are exemplary schematic diagrams of a fuel cell power plant system 100, according to one aspect, and may include a fuel cell power plant cooling structure or fuel cell power plant cooling system. The fuel cell power plant system 100 of FIGS. 1A-1C is depicted with four power units 110, 120, 130, 140. The fuel cell power plant system 100 may further include a fuel cell power plant controller 300 (depicted in FIG. 2), which will be described in greater detail herein. Each one of power units 110, 120, 130, 140 may include two or more fuel cell systems. The fuel cell power plant controller 300 may be electrically connected to the power units 110, 120, 130, 140. The power units 110, 120, 130, 140 depicted in FIGS. 1A-1C each include four fuel cell systems (110a, 110b, 110c, 110d, 120a, 120b, 120c, 120d, 130a, 130b, 130c, 130d, 140a, 140b, 140c, 140d).

One or more of the fuel cell systems (110a, 110b, 110c, 110d, 120a, 120b, 120c, 120d, 130a, 130b, 130c, 130d, 140a, 140b, 140c, 140d) may be repurposed from vehicle fuel cells. One or more of the fuel cell systems may be hydrogen fuel cell systems. The fuel cell systems may include a fuel cell stack, a battery, an air pump, a DC-DC converter 160, a fan, and a fuel cell voltage converter unit (FCVCU). The DC-DC converter 160 may convert high-voltage DC to 12V, may provide galvanic isolation between the high-voltage DC and the 12V, for example. The high-voltage may be 300V-400V while the low-voltage may be 10V-16V, for example. The fuel cell power plant system 100 of FIGS. 1A-1C may be used as a backup power generator in place of a diesel generator, for example. As seen in FIGS. 1A-1C, the fuel cell systems are organized into groups of four and may be referred to as a 'quad' or a 'quad unit' herein. In this way, the four quad units of FIGS. 1A-1C have a total of sixteen fuel cell systems.

One of the two or more fuel cell systems may include a gateway control circuitry 514 (see FIG. 6) controlling engine high voltage (EHV) associated with the corresponding fuel cell system. A first fuel cell system of the two or more fuel cell systems may include a major gateway control circuitry 516 monitoring a water temperature, a fuel leak sensor, or a smoke sensor associated with the corresponding power unit. Each of the two or more fuel cell systems may include a management electronic control unit (ECU) 518 issuing a command to the corresponding fuel cell system. The command may be a vehicle stability management (VSM) override operation or an immobilizer override operation. The two or more power units may output power to a grid inverter.

The utility company may receive energy from a load bank. There may be a first panel which may be a first voltage (e.g., 480 volts) and connected to a transformer which may be stepped down to a second voltage (e.g., lower than the first voltage) single phase which may provide power to the fuel cell power plant system 100. The power units 110, 120, 130, 140 may output power to one or more grid inverters (e.g., a first inverter 112 and a second inverter 114). A second panel may provide auxiliary power to the grid inverters which may be connected to transformers to step back up to the first voltage from the second voltage.

According to one aspect, the fuel cell power plant system 100 of FIGS. 1A-1C may be capable of supporting operation from a black start scenario of restoring power from the fuel cell power plant system 100 from a blackout without relying on any external electric power transmission network to recover from a total or partial shutdown. The fuel cell power plant controller 300 may support operation of standalone and black start conditions. The fuel cell power plant controller 300 may include software to support black start operation, such as software functions to wake from a no-power condition and energize external systems in a proper order or sequence when no power on the grid is present. This may include provisions for start from energy storage and boot-strapping of any associated cooling system. The grid inverters may be configured for black start and operation on a micro-grid structure may be enabled. In this regard, when the system starts from black start the fuel cell power plant controller 300 may energize the grid inverters.

FIGS. 1A-1C illustrate two voltage channels 602, 604 respectively connected to the power units (e.g., quad units) 110, 120, 130, 140. The voltage channels 602, 604 may be high voltage channels and may be independent of one another. According to one aspect, the two voltage channels 602, 604 may be limited to channels to a number of fuel cells to mitigate exposure to shock via system isolation.

Figure 2:
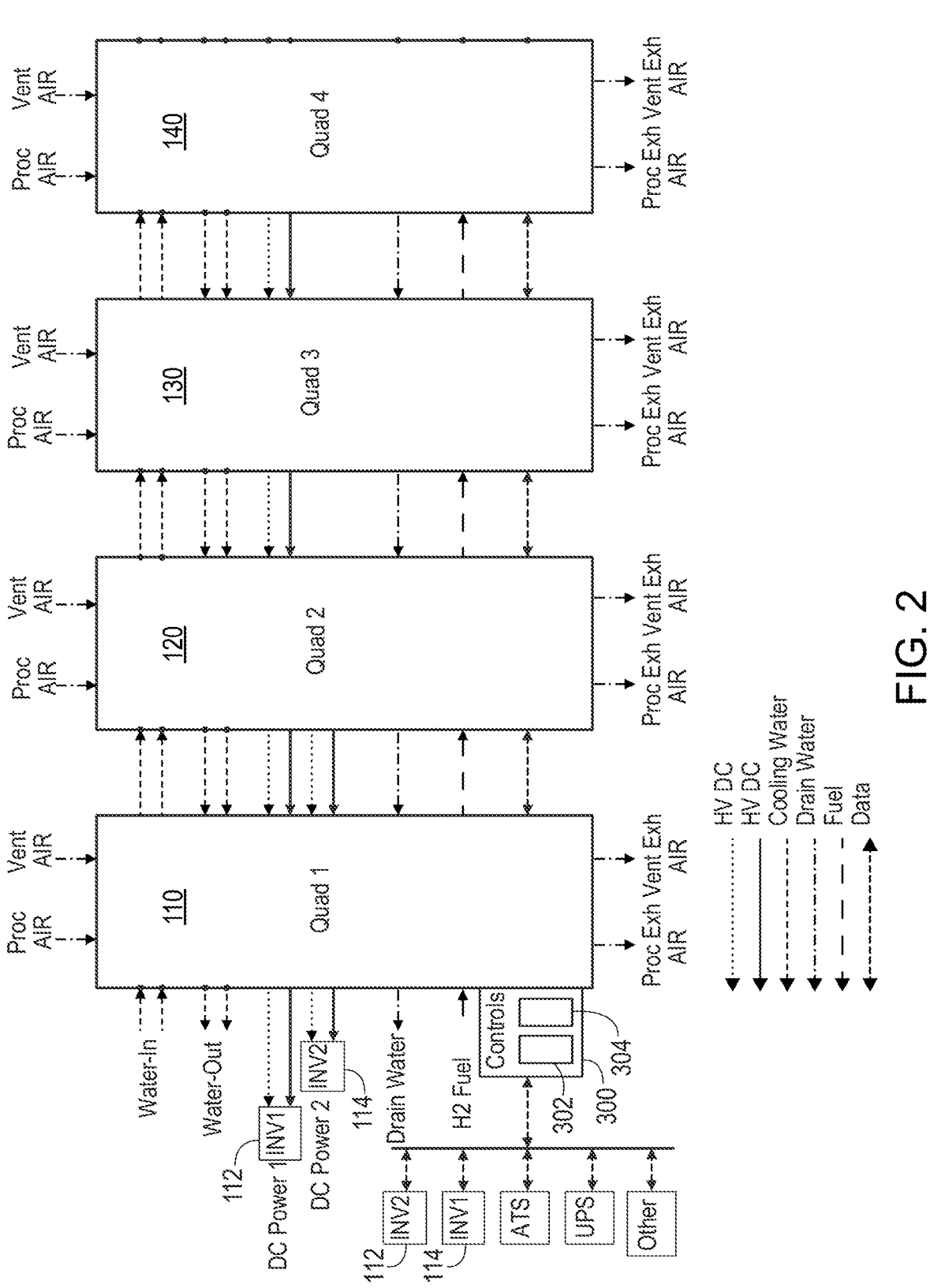
FIG. 2 is an exemplary component diagram of a fuel cell power plant system, according to one aspect.

FIG. 2 is an exemplary component diagram of a fuel cell power plant system 100, according to one aspect. As seen in FIG. 2, respective power units 110, 120, 130, 140 or quad units, as depicted, may be electrically connected, such as in parallel. A fuel cell power plant controller 300 may be electrically connected to one or more of the power units 110, 120, 130, 140 and act as an interface between the power units 110, 120, 130, 140 and the first inverter 112, the second inverter 114, or other circuits. The first inverter 112 and the second inverter 114 may transfer the power generated by the fuel cell power plant system 100 to a load center. Each quad or power unit 110, 120, 130, 140 may receive processed air (e.g., air intake for the fuel cell system), vent air, water or cooling in, and fuel for the respective fuel cell systems and output water or cooling out, power out (e.g., to the first inverter 112 or the second inverter 114), drain water out, processed exhaust air, and vent exhaust air.

The fuel cell power plant controller 300 may include a user control circuitry 302 and a monitoring circuitry 304. The user control circuitry 302 may control a mode of operation of the fuel cell power plant system to be run in an operation mode, a standby mode, a maintenance mode (e.g., enabling operator to force system to start fuel cells for routine maintenance), or an emergency stopped mode. The monitoring circuitry 304 may monitor the two or more power units of the fuel cell power plant system for one or more fault conditions, one or more alarms, or an amount of energy produced.

Figure 3A:
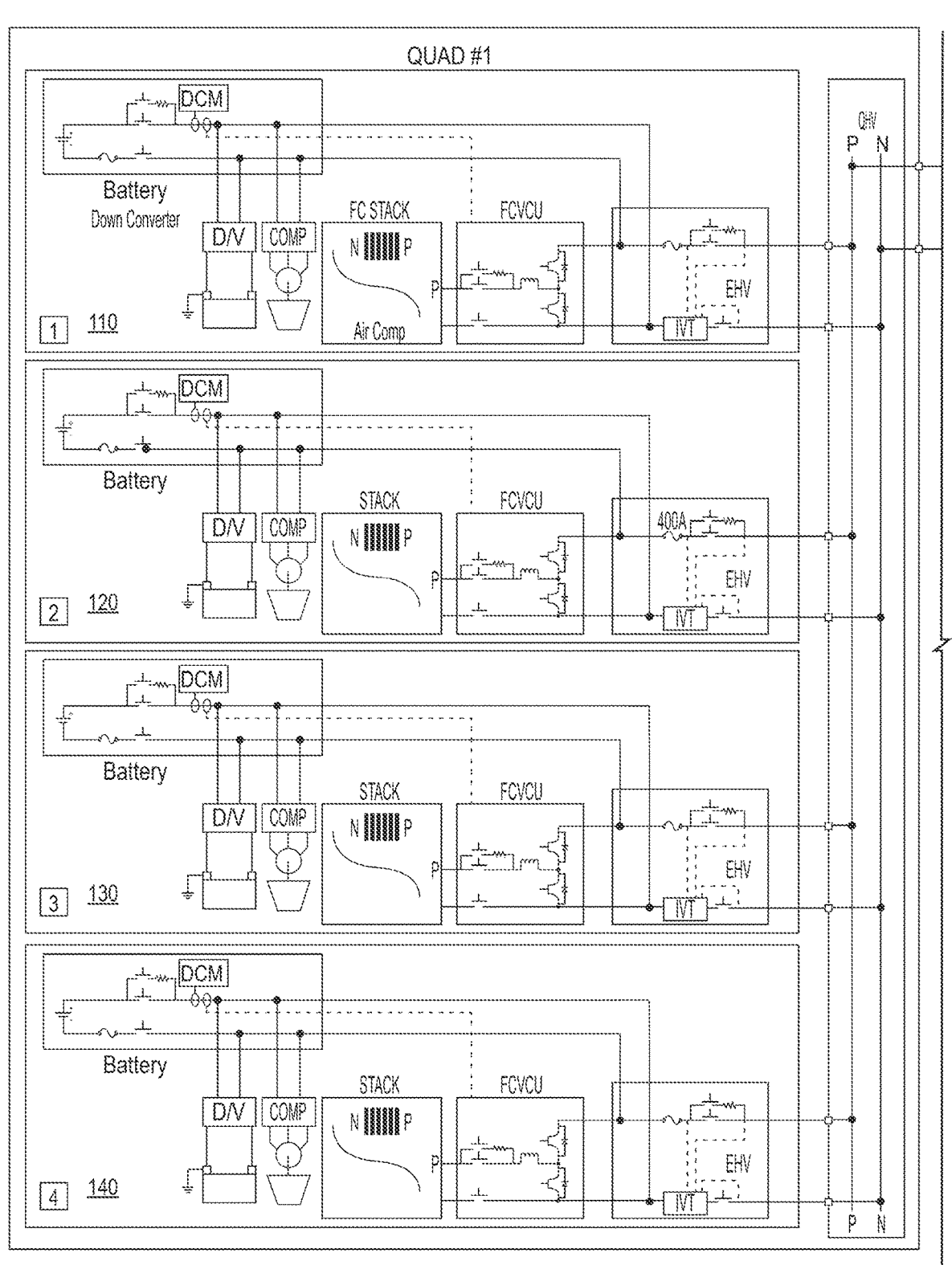
FIGS. 3A-3B are exemplary component diagrams of a fuel cell power plant system, according to one aspect.
Figure 3B:
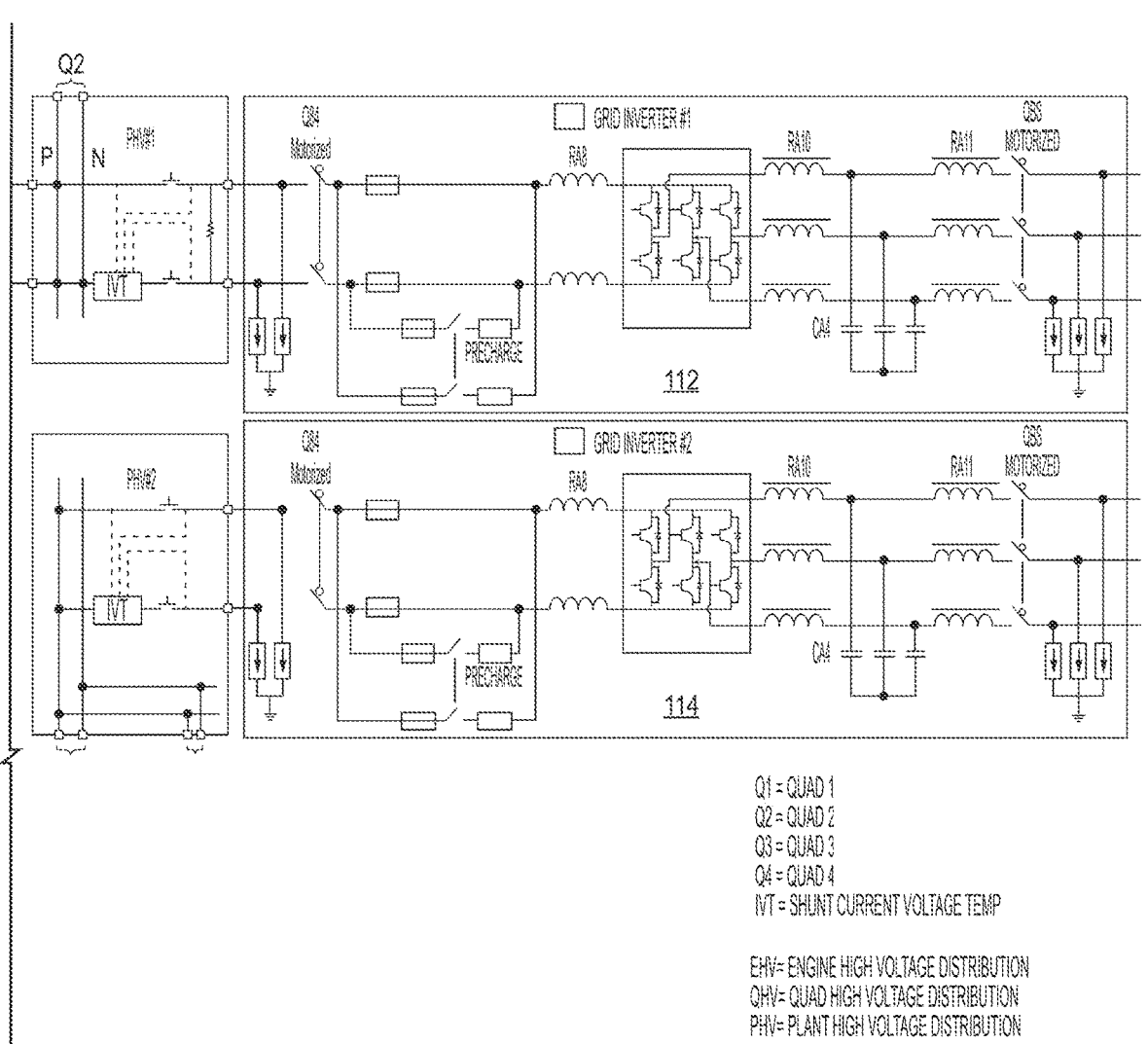

FIGS. 3A-3B are exemplary component diagrams of a fuel cell power plant system, according to one aspect. As seen in FIGS. 3A-3B, the power units 110, 120, 130, 140 or quad units may be electrically connected in parallel. The first inverter 112 and the second inverter 114 may transfer the power generated by the fuel cell power plant system 100 to a load center. Each quad or power unit 110, 120, 130, 140 may receive processed air (e.g., air intake for the fuel cell system), vent air, water or cooling in, and fuel for the respective fuel cell systems and output water or cooling out, power out (e.g., to the first inverter 112 or the second inverter 114), drain water out, processed exhaust air, and vent exhaust air. The fuel cell systems or power units 110, 120, 130, 140 may include a fuel cell stack, a fuel cell battery, an air pump, a fan, a fuel cell voltage converter unit (FCVCU), a gateway control circuitry, a management electronic control unit (ECU), and a fuel cell power plant cooling structure, as will be discussed in greater detail in FIGS. 5A-5B.

12

Figure 4A:
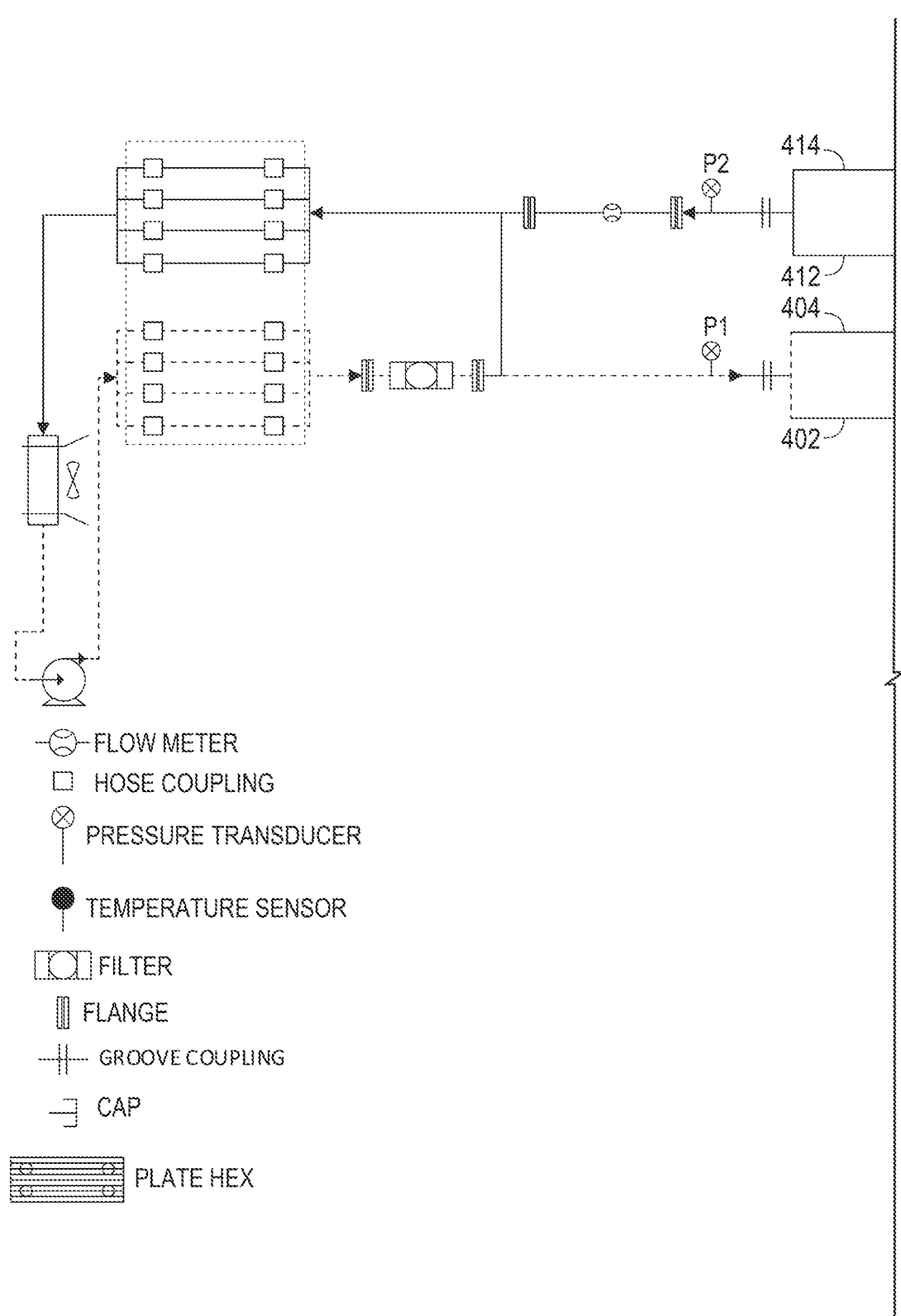
FIGS. 4A-4C are exemplary component diagrams of a fuel cell power plant cooling system, according to one aspect.
Figure 4B:
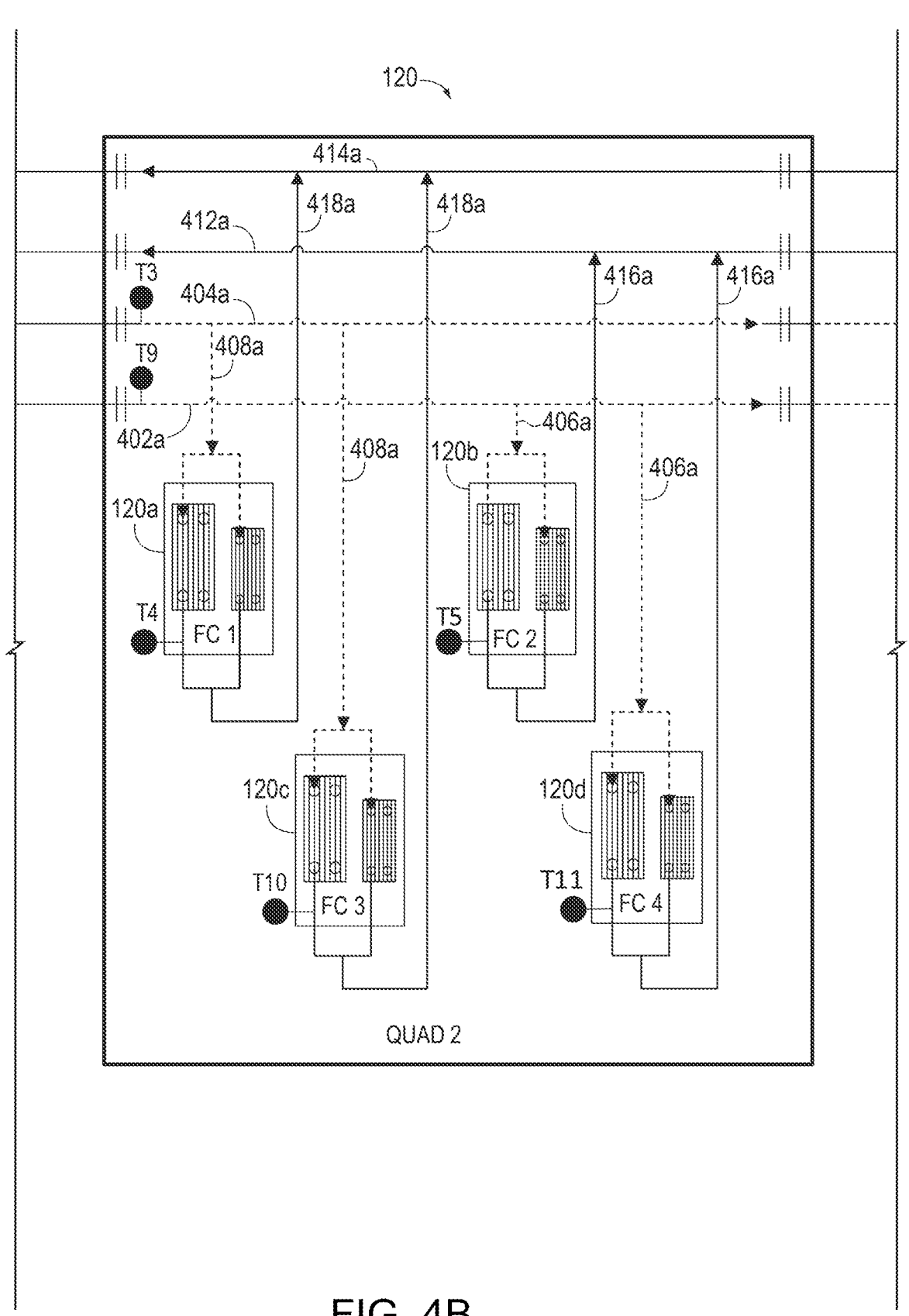
Figure 4C:
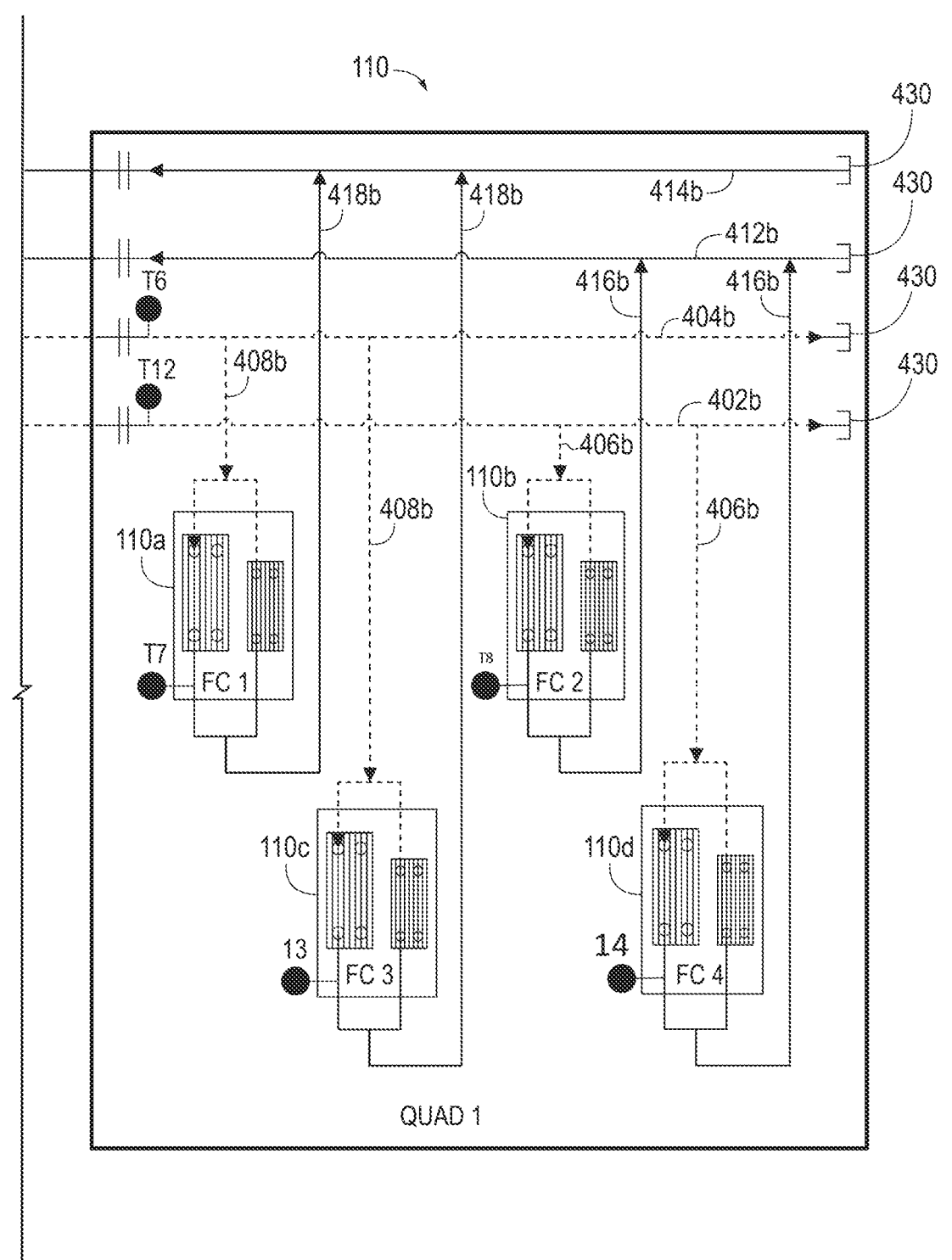

FIGS. 4A-4C are exemplary component diagrams of a fuel cell power plant cooling system, according to one aspect. According to one aspect, a fuel cell power plant cooling system may include one or more power unit coolant supply lines 402, 404, two or more fuel cell system coolant supply lines 406a, 406b, 408a, 408b, two or more fuel cell systems 110a, 110b, 110c, 110d, 120a, 120b, 120c, 120d, two or more fuel cell system return supply lines 416a, 416b, 418a, 418b, and one or more power unit return supply lines 412, 414.

The power unit coolant supply lines 402, 404 may be configured to receive a coolant. The two or more fuel cell system coolant supply lines 406a, 406b, 408a, 408b may be connected to the power unit coolant supply lines 402, 404 and may be configured to receive coolant from the power unit coolant supply lines 402, 404. The two or more fuel cell systems 110a, 110b, 110c, 110d, 120a, 120b, 120c, 120d may be configured to be cooled by the two or more fuel cell system coolant supply lines 406a, 406b, 408a, 408b, respectively. The two or more fuel cell system return supply lines 416a, 416b, 418a, 418b may be connected to the two or more fuel cell system coolant supply lines 406a, 406b, 408a, 408b, respectively, and may be configured to receive coolant from the two or more fuel cell system coolant supply lines 406a, 406b, 408a, 408b. The power unit return supply lines 412, 414 may be connected to the two or more fuel cell system return supply lines 416a, 416b, 418a, 418b and may be configured to receive coolant from the two or more fuel cell system return supply lines 416a, 416b, 418a, 418b, respectively.

With reference to FIG. 4B, an end of the power unit coolant supply line 402a, 404a may be connected to a power unit coolant supply line 402b, 404b of a second fuel cell power plant cooling system, as seen in FIG. 4C. Similarly, an end of the power unit return supply line 412a, 414a may be connected to a power unit return supply line 412b, 414b of the second fuel cell power plant cooling system of FIG. 4C.

With reference to FIG. 4C, an end of the power unit coolant supply lines 402b, 404b may be capped 430. Similarly, an end of the power unit return supply lines 412b, 414b may be capped 430. According to one aspect, a fuel cell power plant cooling structure may include a first fuel cell power plant cooling system (e.g., FIG. 4B) and a second fuel cell power plant cooling system (e.g., FIG. 4C).

Each of the first fuel cell power plant cooling system and the second fuel cell power plant cooling system may include one or more power unit coolant supply lines 402 including 402a, 402b, 404 including 404a, 404b, two or more fuel cell system coolant supply lines 406a, 406b, 408a, 408b, two or more fuel cell systems 110a, 110b, 110c, 110d, 120a, 120b, 120c, 120d, two or more fuel cell system return supply lines 416a, 416b, 418a, 418b, and one or more power unit return supply lines 412 including 412a, 412b, 404 including 414a, 414b. The power unit coolant supply lines 402, 404 may be configured to receive a coolant. The two or more fuel cell system coolant supply lines 406a, 406b, 408a, 408b may be connected to the power unit coolant supply lines 402, 404 and may be configured to receive coolant from the power unit coolant supply lines 402, 404. The two or more fuel cell systems 110a, 110b, 110c, 110d, 120a, 120b, 120c, 120d may be configured to be cooled by the two or more fuel cell system coolant supply lines 406a, 406b, 408a, 408b, respectively. The two or more fuel cell system return supply lines 416a, 416b, 418a, 418b may be connected to the two or more fuel cell system coolant supply lines 406a, 406b, 408a, 408b, respectively, and may be configured to receive used coolant from the two or more fuel cell system coolant supply lines 406a, 406b, 408a, 408b. The power unit return supply lines 412, 414 may be connected to the two or more fuel cell system return supply lines 416a, 416b, 418a, 418b and may be configured to receive used coolant from the two or more fuel cell system return supply lines 416a, 416b, 418a, 418b, respectively.

The second fuel cell power plant cooling system may include a second power unit coolant supply line 402b, 404b which may be configured to receive the coolant from the power unit coolant supply lines 402, 404 (e.g., 402a, 404a). The second fuel cell power plant cooling system may include one or more second power unit return supply lines 412b, 414b which may be configured to receive the used coolant from the fuel cell system return supply lines 416b, 418b. An end of the second power unit coolant supply line 402b, 404b may be capped 430. An end of the second power unit return supply line 412b, 414b may be capped 430.

Figure 5A:
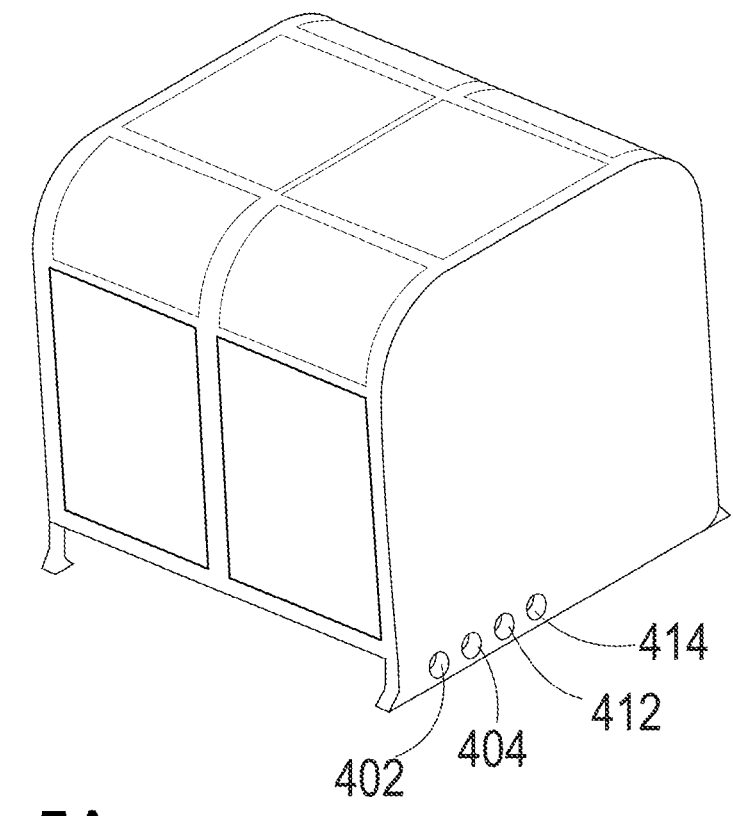
FIGS. 5A-5B are exemplary exploded views of a fuel cell power plant cooling structure, according to one aspect.
Figure 5B:
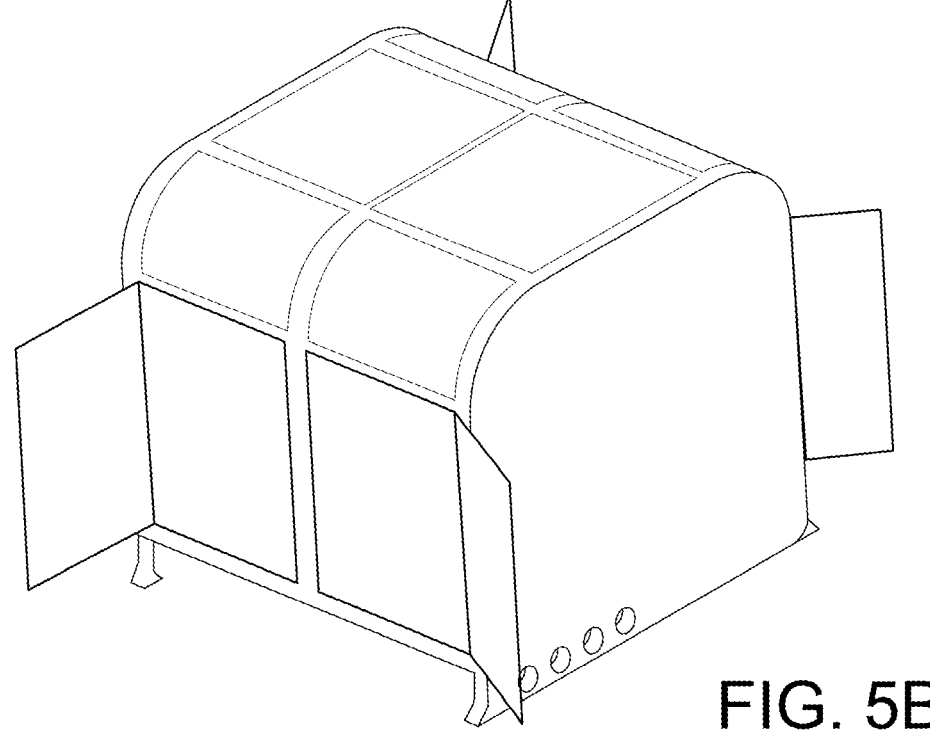
Figure 6:
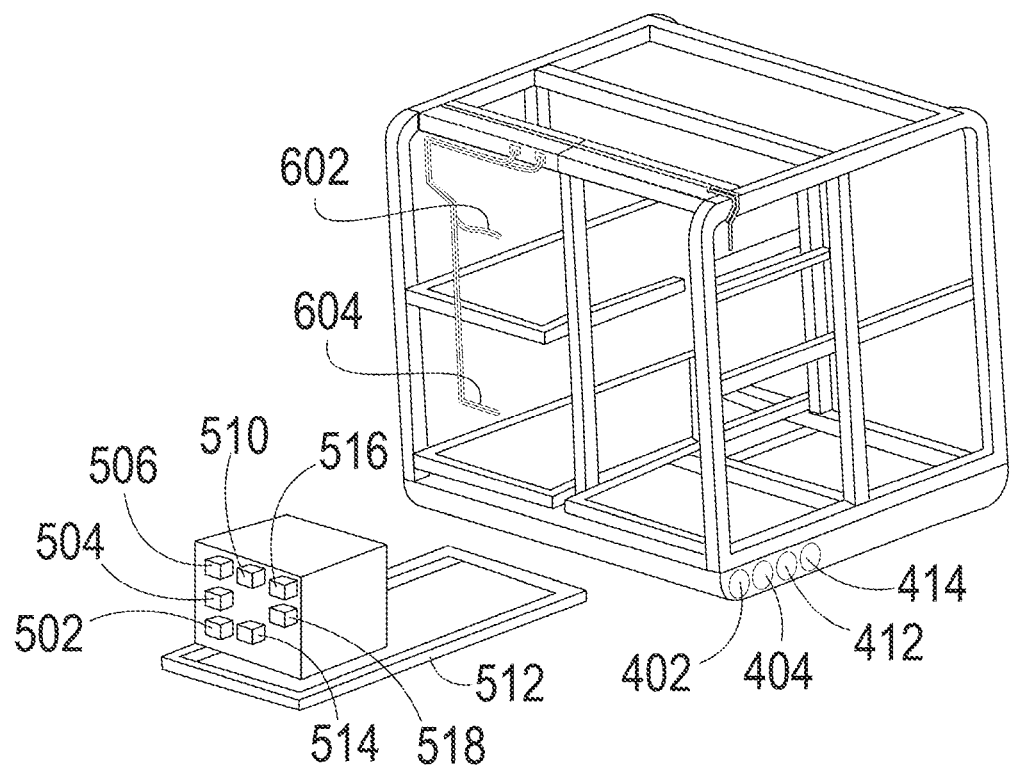
FIG. 6 is exemplary exploded view of a fuel cell power plant cooling structure, according to one aspect.

FIGS. 5A-5B are exemplary exploded views of a fuel cell power plant cooling structure, according to one aspect. The fuel cell systems may include a fuel cell stack 502, a fuel cell battery 504, an air pump 506, a fuel cell voltage converter unit (FCVCU) 510, a gateway control circuitry 514 which may include a major gateway control circuitry 516, a management electronic control unit (ECU) 518, and a fuel cell power plant cooling structure. As seen in FIG. 6, a fuel cell system may be placed on a sliding skid 512 so that the fuel cell system may be individually slid out for maintenance. The fuel cell power plant cooling system may include two or more slidable fuel cell system skids which may accommodate the two or more fuel cell systems, respectively.

Additionally, it may be seen that the power unit is configured to be modular and connections for cooling may be located on a platform under the power unit. Two of the connections may be power unit coolant supply lines 402, 404 and two of the connections may be power unit return supply lines 412, 414. The coolant may be water, for example.

The power unit may be sealed and an enclosure of the power unit may be rain, snow, sleet, dust, hose down, and/or corrosive agent proof. According to one aspect, the enclosure of the power unit may be submersion proof in the event of a flood, for example. Within the power unit, ventilation may be provided, and a fan may be utilized. According to one aspect, the cabin of the power unit may be held at negative pressure, such as via mounting and operating fans on a top portion while vents are located in a bottom portion of the power unit. The power unit may be operated according to a desired dilution specification, a desired cool specification, and a desired consumption specification.

Figure 7:
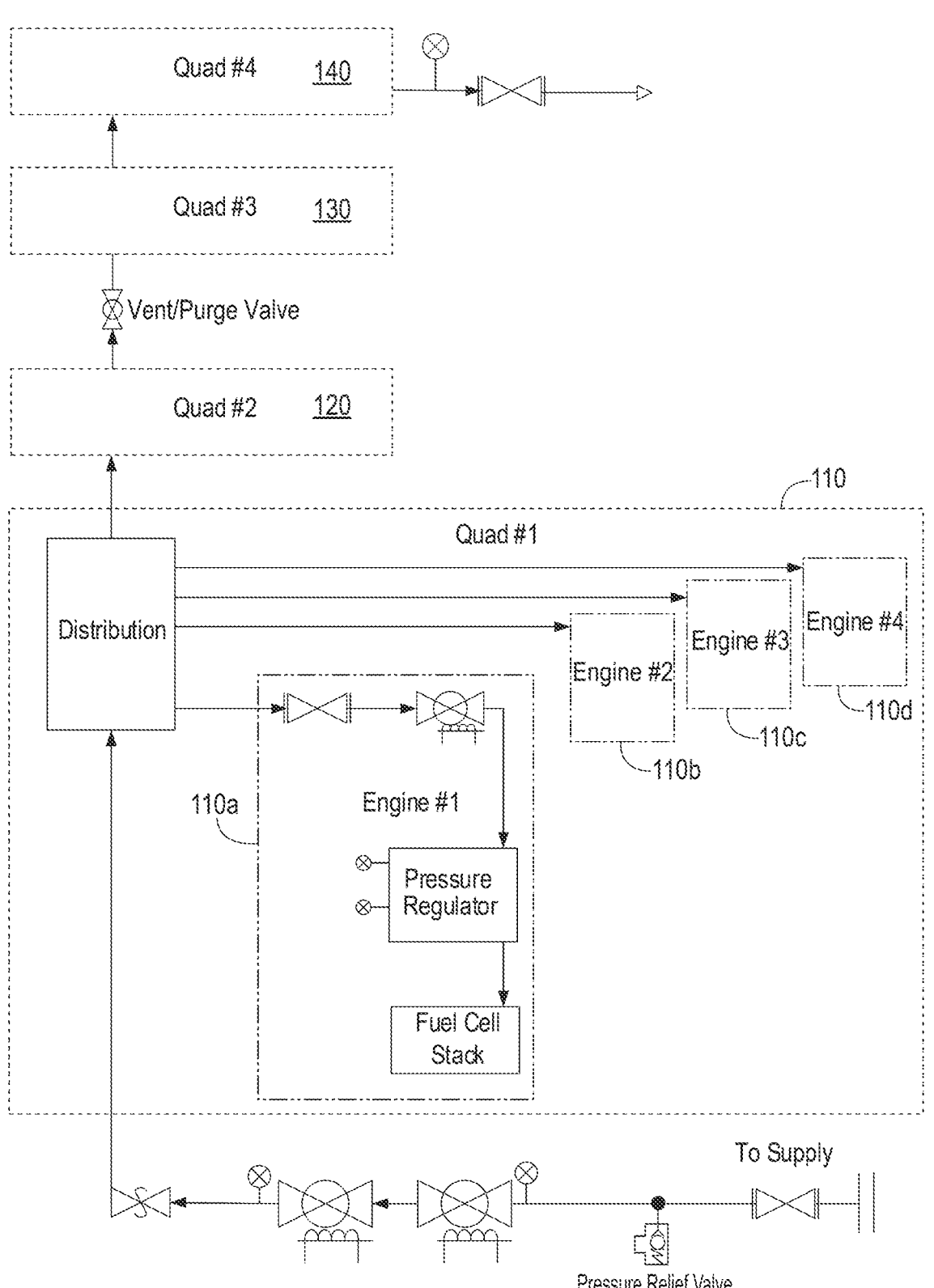
FIG. 7 is an exemplary schematic diagram of a fuel system for a fuel cell power plant system, according to one aspect.

FIG. 7 is an exemplary schematic diagram of a fuel system for a fuel cell power plant system 100, according to one aspect. The fuel system may enable even flow distribution, via a distributor, between quad units and engines, include low leak connectors, be formed of stainless steel bent tubing or high-pressure hose and may include electrical sensors for pressure sensing. The sensors may provide sensor reading to the fuel cell power plant controller 300 for fault monitoring in real time.

Figure 8:
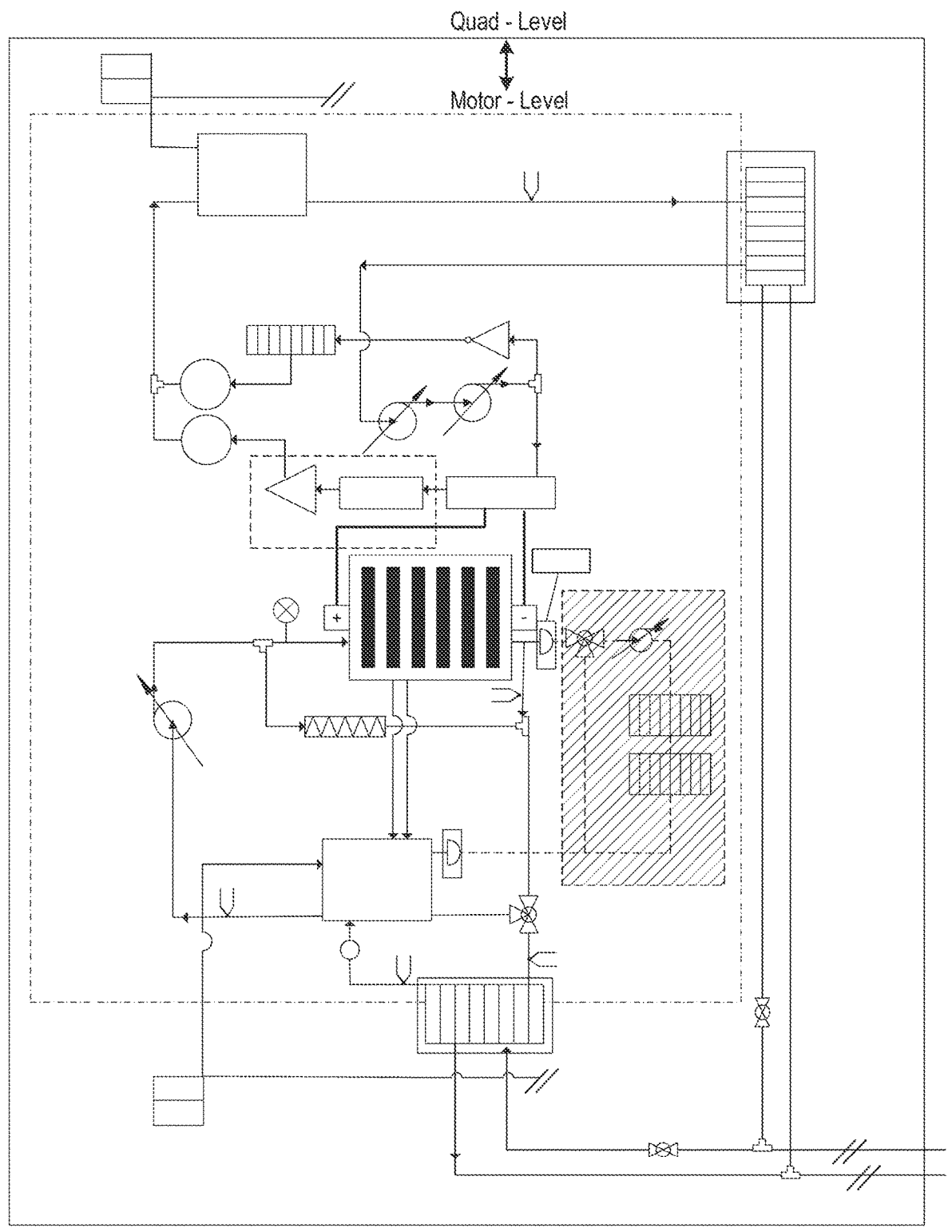
FIG. 8 is an exemplary schematic diagram of engine-level cooling for a fuel cell power plant cooling system, according to one aspect.

FIG. 8 is an exemplary schematic diagram of engine-level cooling for a fuel cell power plant cooling system, according to one aspect. FIG. 8 illustrates a high-level diagram of the motor-level or engine-level aspects of the heat exchanger for the fuel cell power plant cooling system. Greater detail of the heat exchanger will be provided with reference to FIGS. 9A-9B.

Figure 9A:
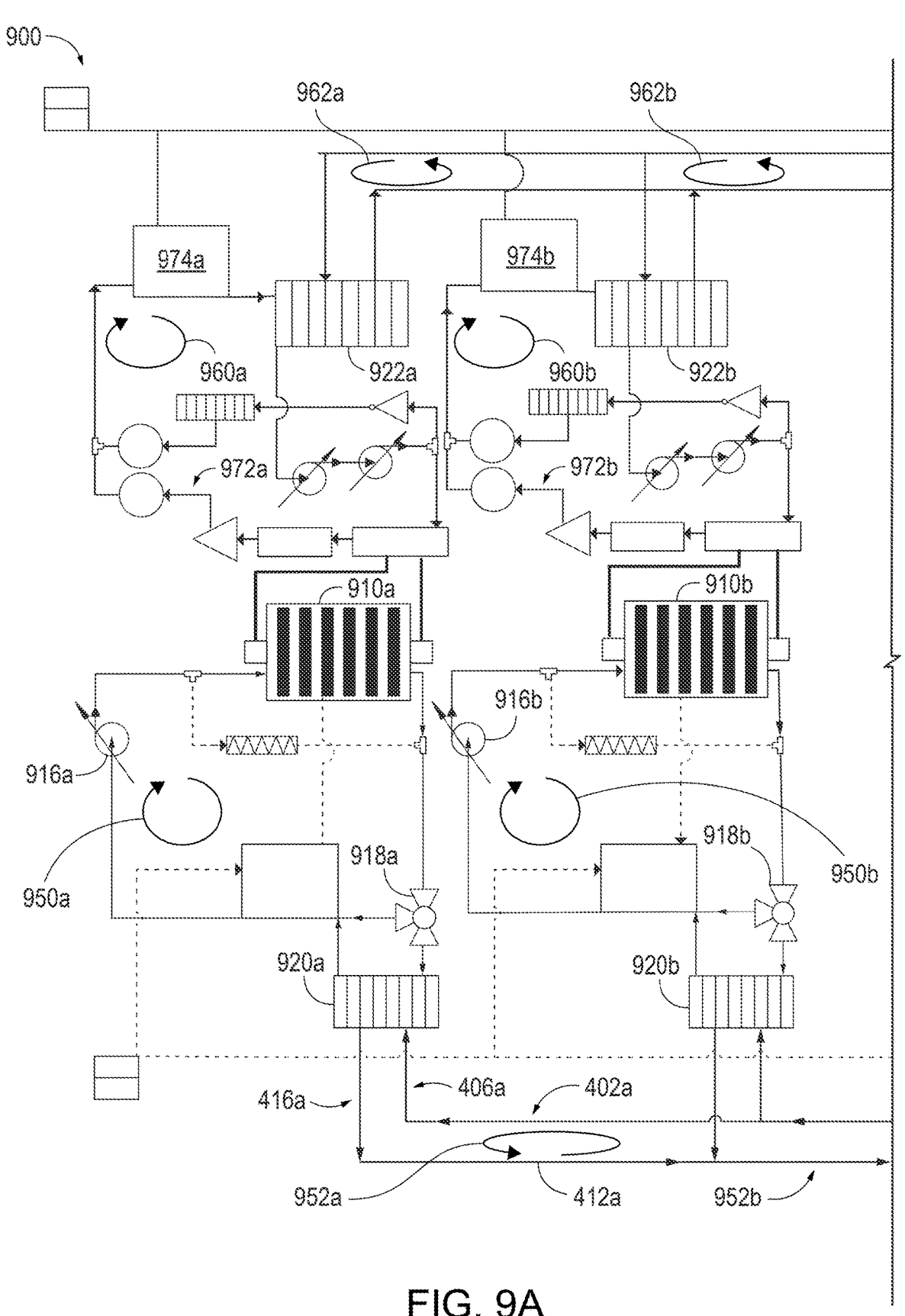
FIGS. 9A-9B are exemplary schematic diagrams of quad-level cooling for a fuel cell power plant cooling system, according to one aspect.
Figure 9B:
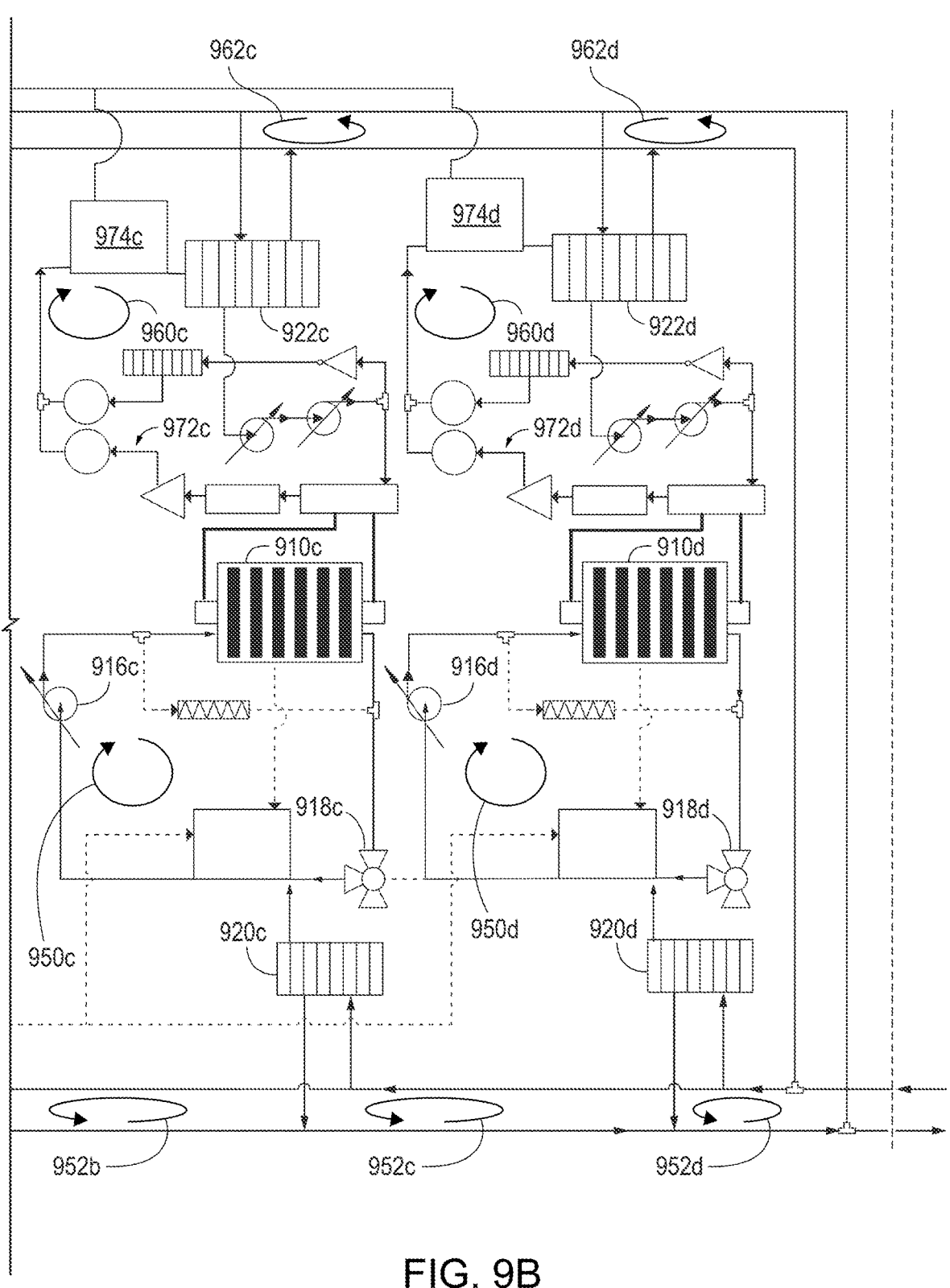

FIGS. 9A-9B are exemplary schematic diagrams of quad-level cooling for a fuel cell power plant cooling system, according to one aspect. As seen in FIGS. 9A-9B, one or more heat exchangers 900 may provide for reduced volume and increased performance by utilizing a two-plate configuration. The heat exchangers 900 may be compact, which reduces volume of fluids or coolants and also reduces warm up time associated with the fuel cells. Further, separation of two or more plates ensures that clean fluid or coolant stays clean and enables use of other fluids, including pure water, 50/50 ethylene glycol, or other media.

The heat exchanger 900 may be a plate heat exchanger for application of multi-fuel cell systems. Associated benefits include separation of a clean coolant loop from an external non-clean coolant loop. Interchange of heat from multiple sources to a single source (e.g., from the cooling tower, large air cooler, or other process cooling sources) may be utilized. In this way, reduction in cooling fluid volume on the clean coolant or water loop side of system may be achieved.

According to one aspect, a heat exchanger 900 for a fuel cell power plant system may include a first loop 950a, 950b, 950c, 950d and a second loop 952a, 952b, 952c, 952d. For the first loop 950a, 950b, 950c, 950d, a first coolant may be passed through a fuel cell stack 910a, 910b, 910c, 910d, a thermostat 918a, 918b, 918c, 918d, a first portion of a first plate 920a, 920b, 920c, 920d of the heat exchanger 900, and a fuel cell pump 916a, 916b, 916c, 916d. The first loop 950a, 950b, 950c, 950d may be a clean coolant loop. For the second loop 952a, 952b, 952c, 952d, a second coolant may be passed through a second portion of the first plate 920a, 920b, 920c, 920d of the heat exchanger 900. The second coolant may be received from an external source, such as a cooling tower or a cooling truck. The second loop may be less clean than the first loop with regard to coolant cleanliness. The heat exchanger for the fuel cell power plant system may include a fuel cell system coolant supply line 406a receiving the second coolant and a fuel cell system return supply line 416a returning used coolant.

The thermostat 918a, 918b, 918c, 918d may regulate a path of the first loop 950a, 950b, 950c, 950d. For example, if a temperature of the first coolant is above a threshold, the first loop 950a, 950b, 950c, 950d may include the first portion of the first plate 920a, 920b, 920c, 920d of the heat exchanger. If a temperature of the first coolant is below a threshold, the first loop may not include the first portion of the first plate 920a, 920b, 920c, 920d of the heat exchanger.

The heat exchanger for the fuel cell power plant system may include a third loop 960a, 960b, 960c, 960d and a fourth loop 962a, 962b, 962c, 962d. For the third loop 960a, 960b, 960c, 960d, a third coolant may be passed through an area associated with circuitry 972a, 972b, 972c, 972d, the fuel cell stack 910a, 910b, 910c, 910d, an expansion tank 974a, 974b, 974c, 974d, and a first portion of a second plate 922a, 922b, 922c, 922d of the heat exchanger. For the fourth loop 962a, 962b, 962c, 962d, the second coolant may be passed through a second portion of the second plate 922a, 922b, 922c, 922d of the heat exchanger. The first plate 920a, 920b, 920c, 920d may have a greater size than the second plate 922a, 922b, 922c, 922d of the heat exchanger. The first coolant or the second coolant may be water.

Figure 10A:
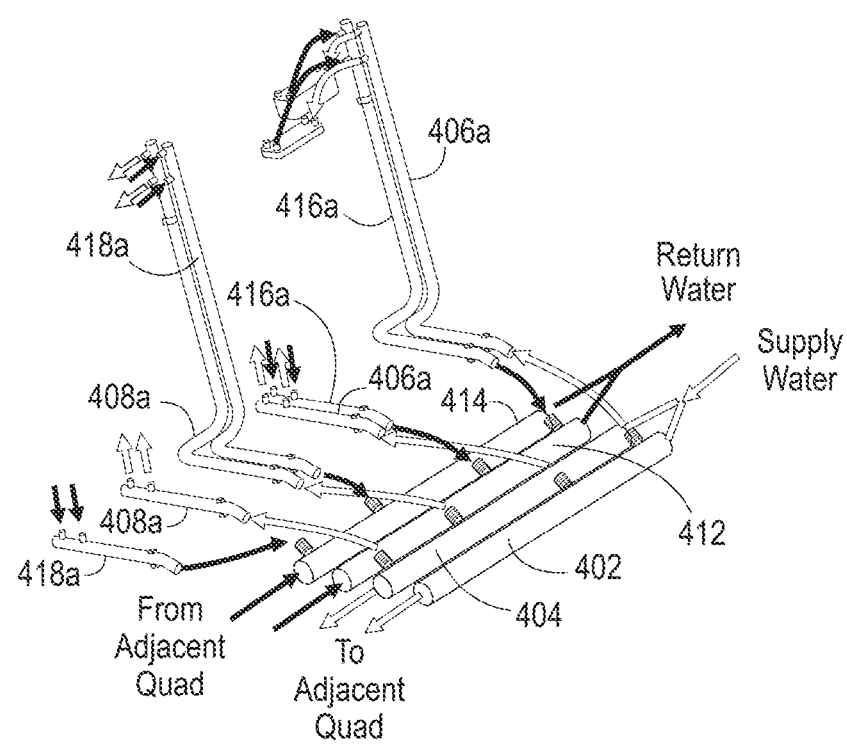
FIGS. 10A-10B are exemplary schematic diagrams of plant-level cooling for a fuel cell power plant cooling system, according to one aspect.
Figure 10B:
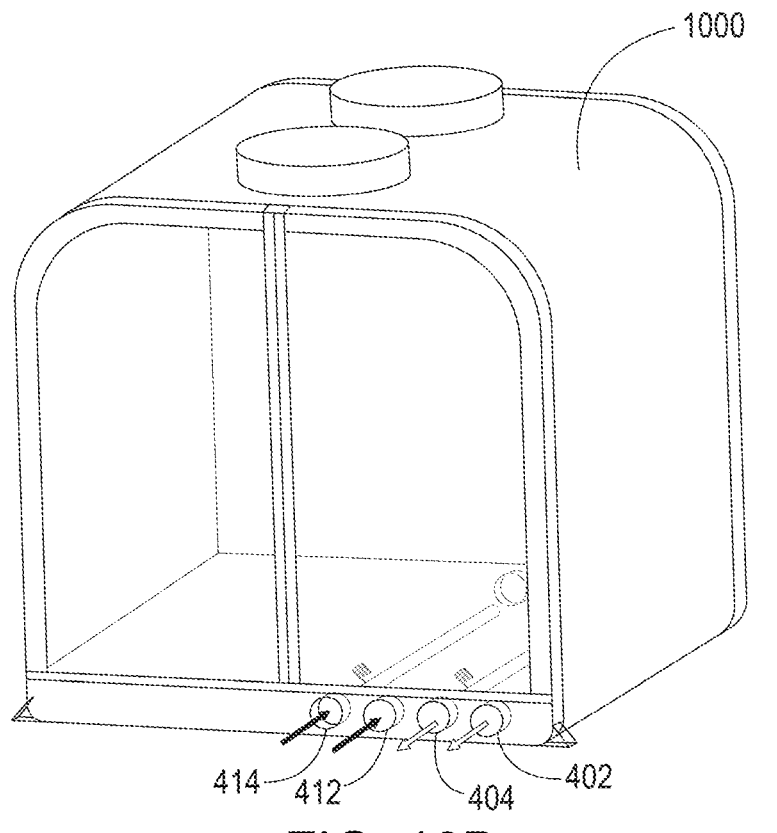
Figure 11D:
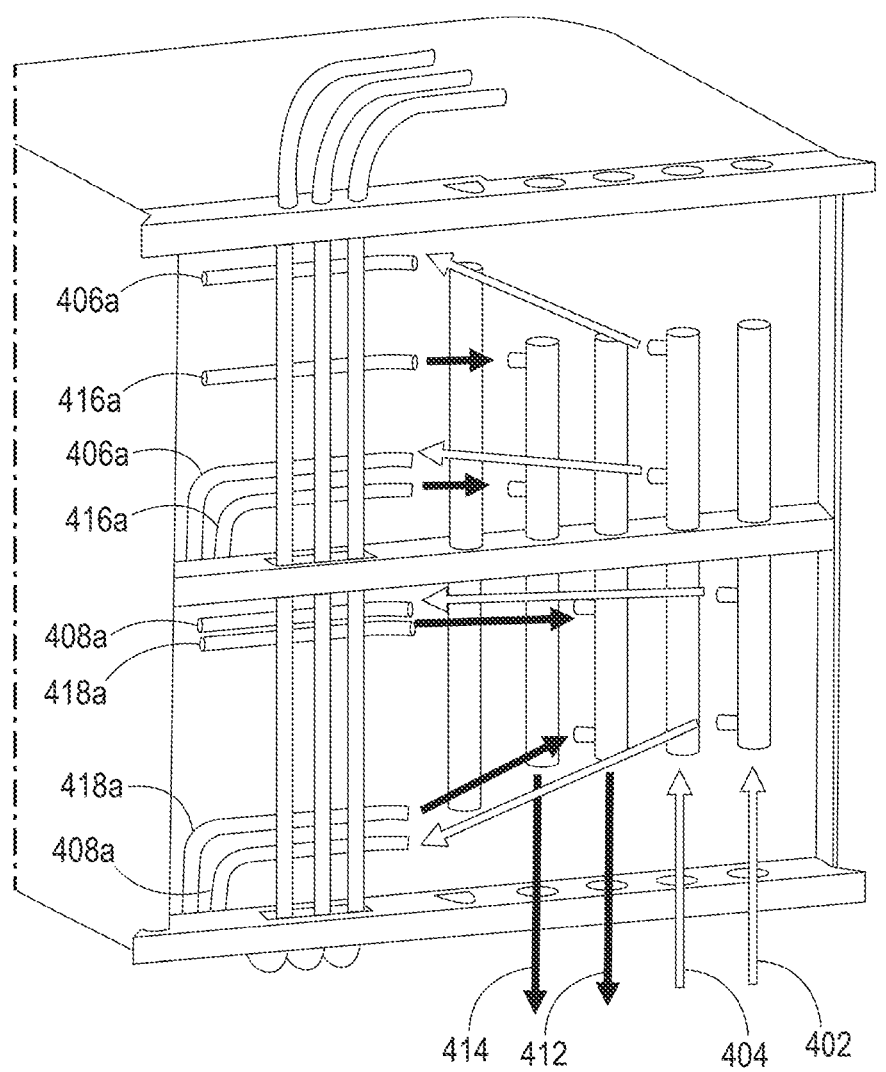

FIGS. 10A-10B are exemplary schematic diagrams of plant-level cooling for a fuel cell power plant cooling system, according to one aspect. A housing 1000 may be provided for the fuel cell power plant cooling system.

FIGS. 11A-11D are exemplary schematic diagrams of quad-level cooling for a fuel cell power plant cooling system, as seen from a bottom view, according to one aspect. As seen, water may be used as coolant for the fuel cell system coolant supply lines 406a, 408a and/or the fuel cell system return supply lines 416a, 418a. Cool water may be supplied via the fuel cell system coolant supply lines 406a, 408a and hot water returned through the fuel cell system return supply lines 416a, 418a.

Figure 12A:
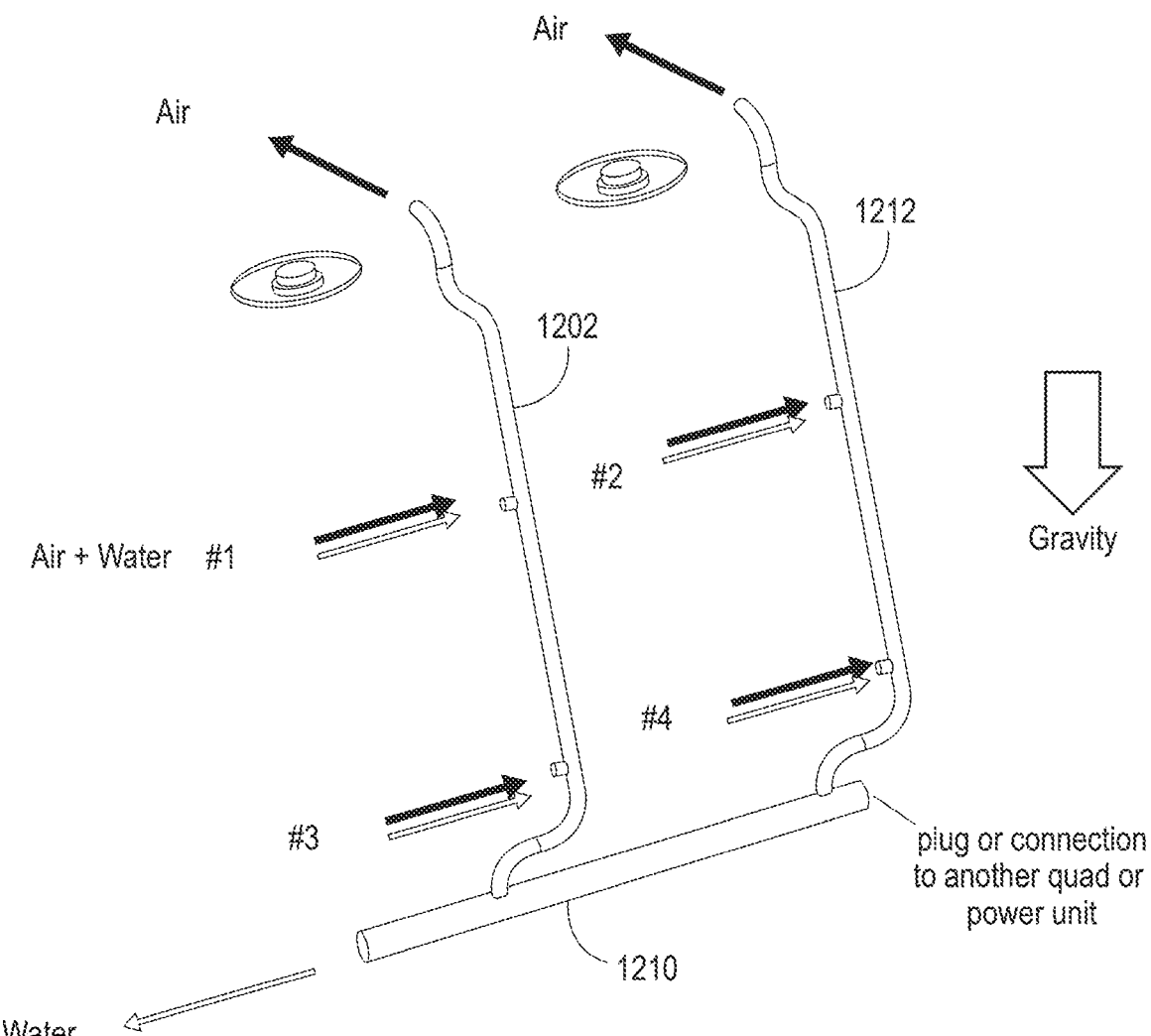
FIGS. 12A-12C are exemplary schematic diagrams of condensate exhaust systems for a fuel cell power plant cooling system, according to one aspect.
Figure 12B:
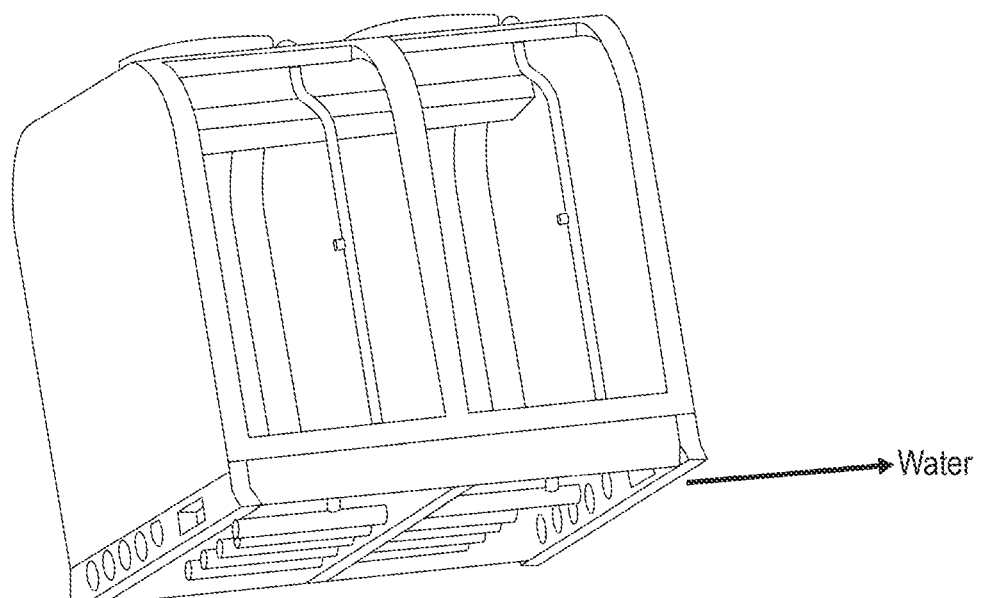
Figure 12C:
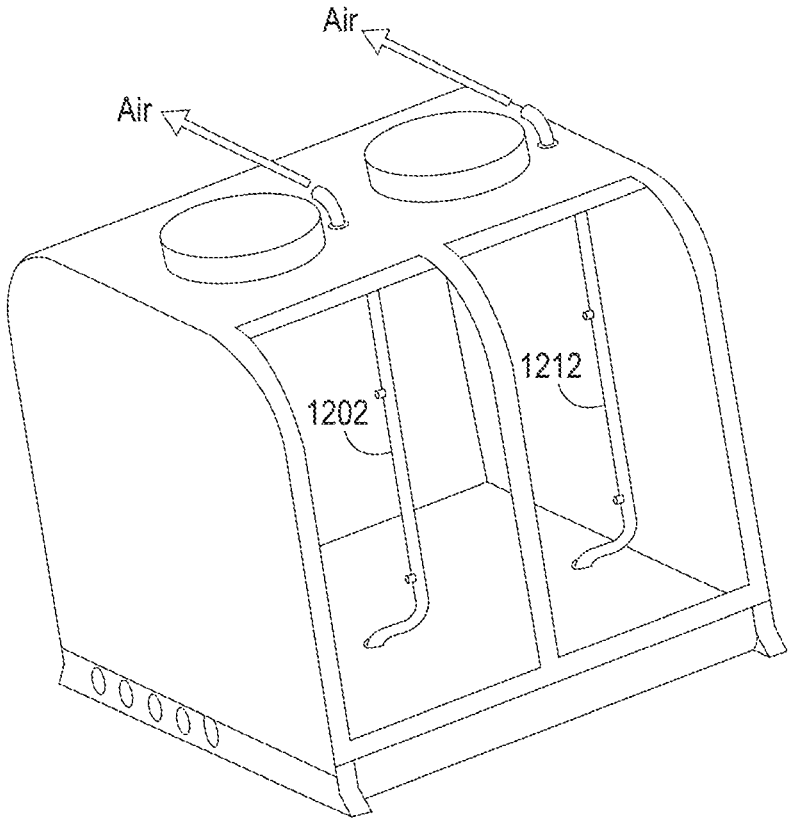

FIGS. 12A-12C are exemplary schematic diagrams of condensate exhaust systems for a fuel cell power plant cooling system, according to one aspect. The fuel cell power plant cooling system or fuel cell power plant cooling structure may include two or more fuel cell system exhaust lines 1202, 1212 which may be connected to a condensate drain line 1210 and may be configured to expel exhaust from the power unit coolant supply line. As seen in FIGS. 12A-12C, the two or more fuel cell system exhaust lines 1202, 1212 may be oriented in a vertical direction relative to a ground plane while the condensate drain line 1210 may be connected to fuel cell system exhaust lines 1202, 1212 and the condensate drain line 1210 may be substantially parallel to the ground plane.

Figure 13A:
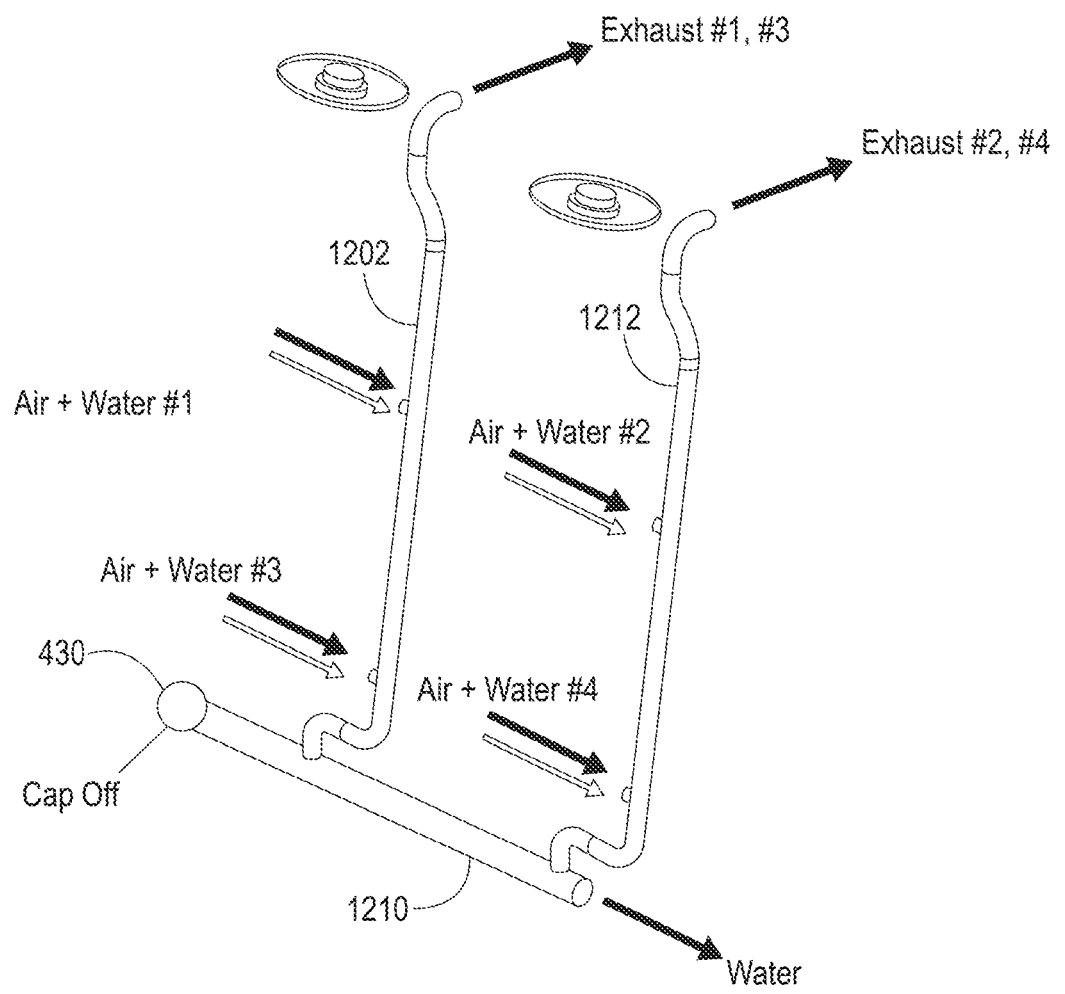
FIGS. 13A-13B are exemplary schematic diagrams of condensate exhaust systems for a fuel cell power plant cooling system, according to one aspect.
Figure 13B:
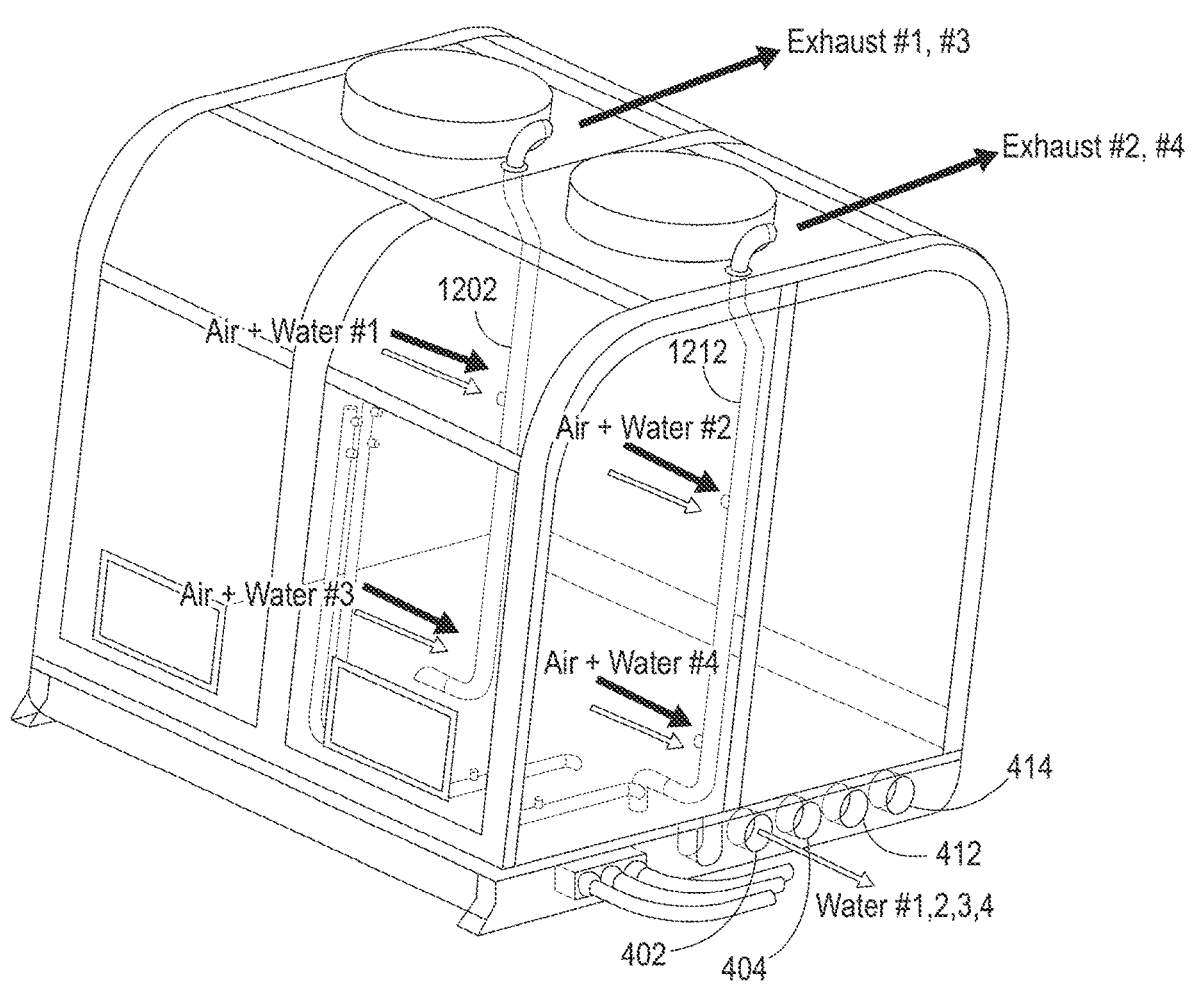

FIGS. 13A-13B are exemplary schematic diagrams of condensate exhaust systems for a fuel cell power plant cooling system, according to one aspect. Here, exhaust vents are shown on the top of the fuel cell power plant cooling system/structure, as fed by fuel cell system exhaust lines 1202, 1212.

Figure 14:
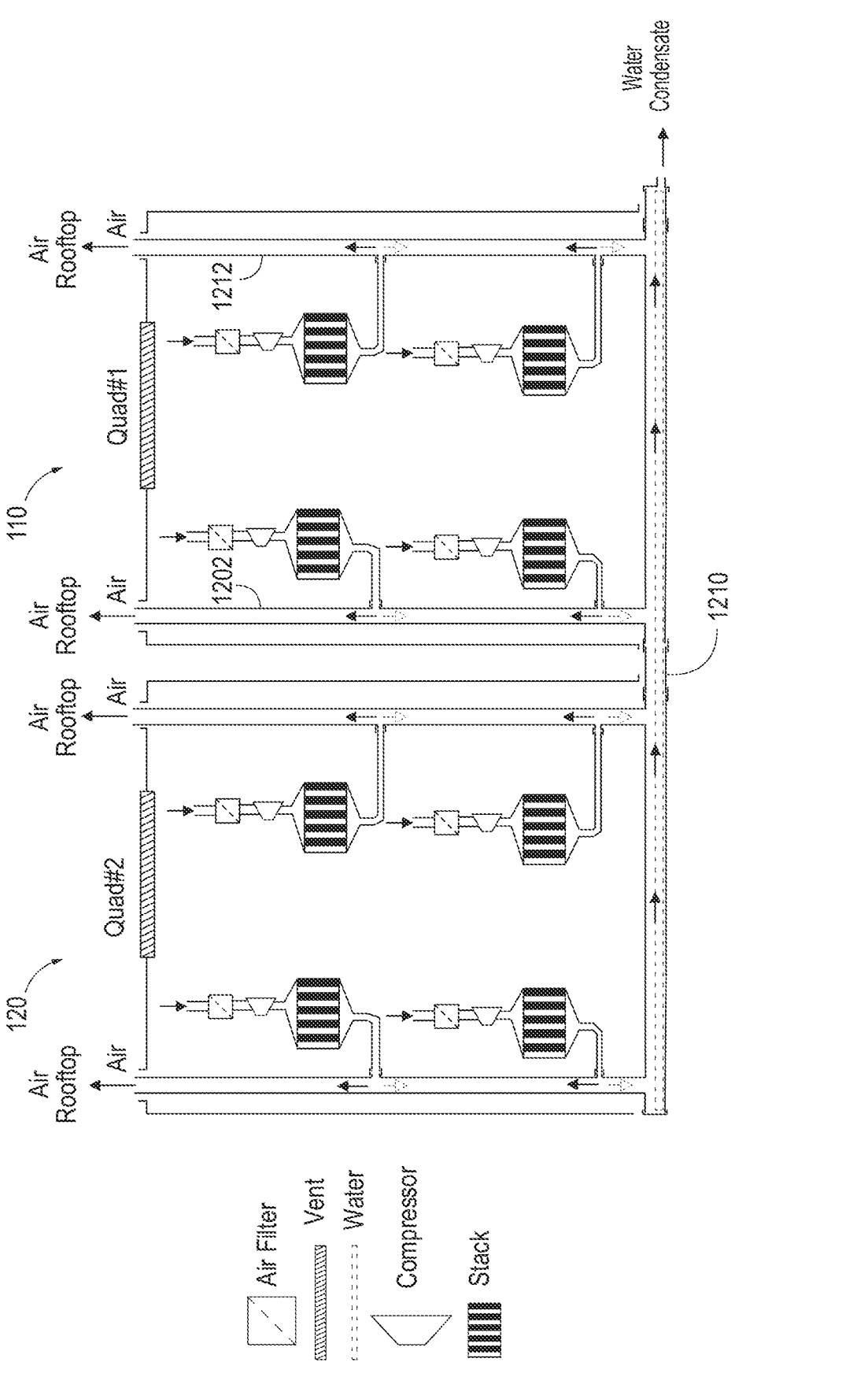
FIG. 14 is an exemplary schematic diagram of a condensate exhaust system for a fuel cell power plant cooling system, according to one aspect.

FIG. 14 is an exemplary schematic diagram of a condensate exhaust system for a fuel cell power plant cooling system, according to one aspect. Again, exhaust vents (e.g., air rooftop) are shown on the top of the fuel cell power plant cooling system/structure, as fed by fuel cell system exhaust lines 1202, 1212. Water condensate may be piped out parallel to the ground plane via condensate drain line 1210.

The fuel cell power plant cooling system or fuel cell power plant cooling structure may include two or more fuel cell system exhaust lines 1202, 1212 which may be connected to a condensate drain line 1210 and may be configured to expel exhaust from the power unit coolant supply line. The two or more fuel cell system exhaust lines 1202, 1212 may be oriented in a vertical direction relative to a ground plane. The two or more fuel cell system coolant supply lines may be oriented in a vertical direction relative to a ground plane (e.g., the horizontal dashed line, as seen in FIG. 14).

Figure 15:
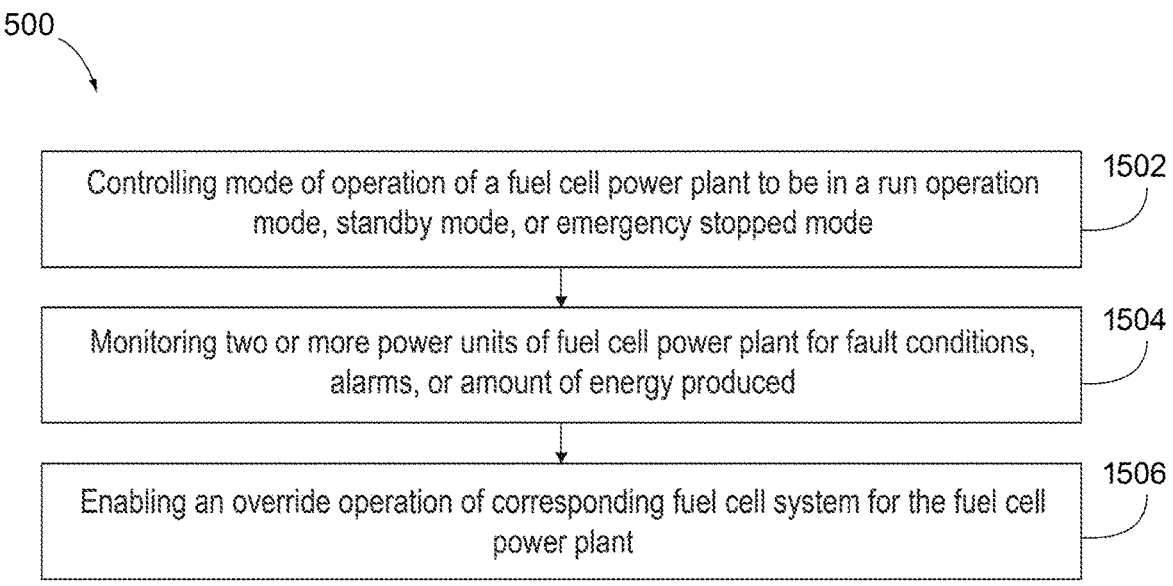
FIG. 15 is an exemplary flow diagram of a method for operating a fuel cell power plant, according to one aspect.

FIG. 15 is an exemplary flow diagram of a method 1500 for operating a fuel cell power plant, according to one aspect. The method 1500 for operating a fuel cell power plant may include controlling 1502 a mode of operation of a fuel cell power plant to be in a run in an operation mode, standby mode, or emergency stopped mode, monitoring 1504 two or more power units of fuel cell power plant for fault conditions, alarms, or amount of energy produced, and enabling 1506 an override operation of corresponding fuel cell system for the fuel cell power plant.

Figure 16:
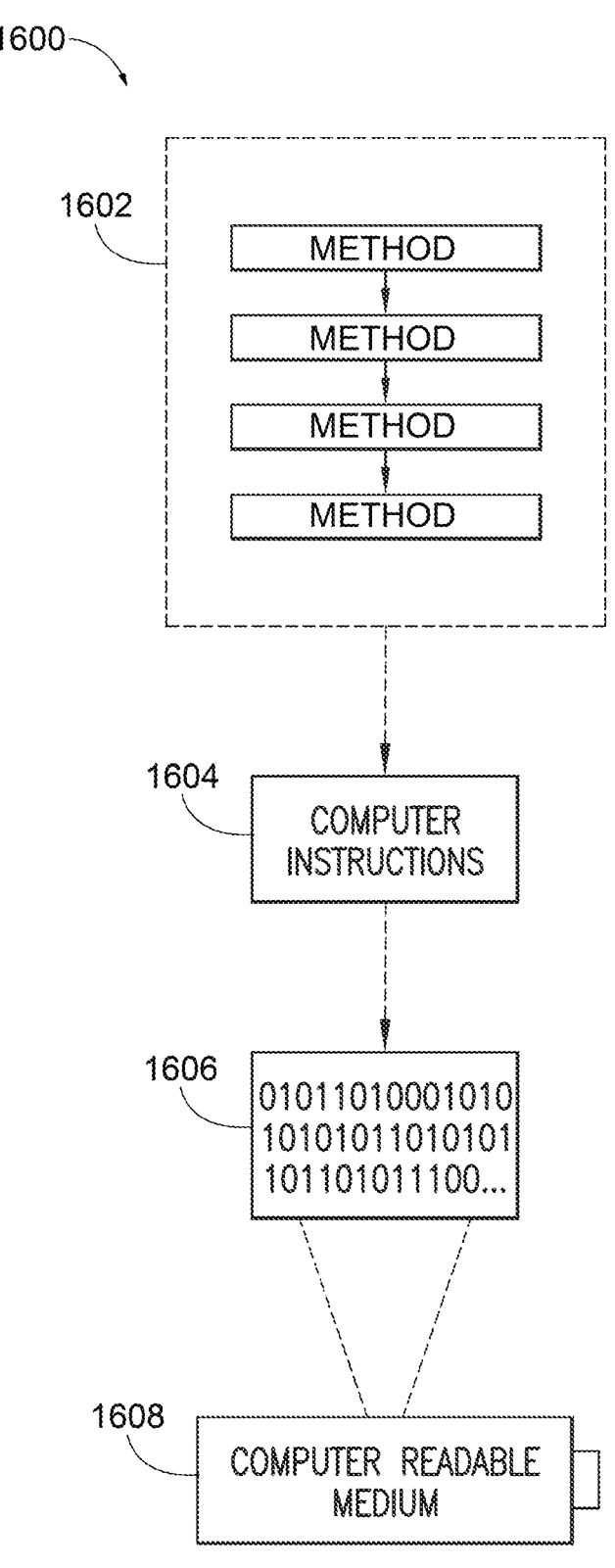
FIG. 16 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 16, wherein an implementation 1600 includes a computer-readable medium 1608, such as a CD-R, DVD-R, flash drive, a platter of a hard disk drive, etc., on which is encoded computer-readable data 1606. This encoded computer-readable data 1606, such as binary data including a plurality of zero's and one's as shown in 1606, in turn includes a set of processor-executable computer instructions 1604 configured to operate according to one or more of the principles set forth herein. In this implementation 1600, the processor-executable computer instructions 1604 may be configured to perform a method 1602, such as the method 1500 of FIG. 15. In another aspect, the processor-executable computer instructions 1604 may be configured to implement a system, such as the fuel cell power plant system 100 of FIGS. 1-10. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 17:
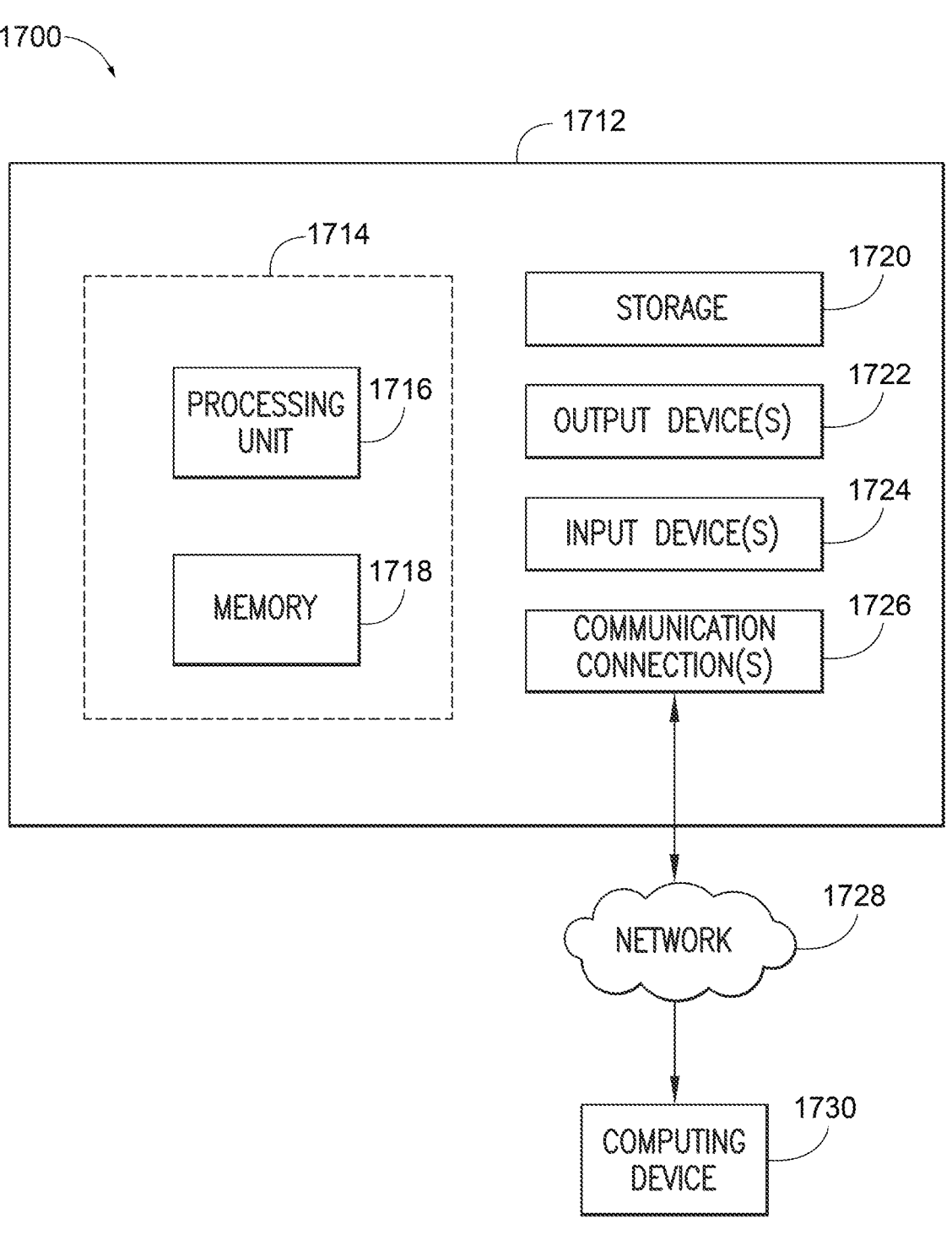
FIG. 17 is an illustration of an example computing environment where one or more of the provisions set forth herein are implemented, according to one aspect.

FIG. 17 and the following discussion provide a description of a suitable computing environment to implement aspects of one or more of the provisions set forth herein. The operating environment of FIG. 17 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, programmable logic controllers (PLCs), etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 17 illustrates a system 1700 including a computing device 1712 configured to implement one aspect provided herein. In one configuration, the computing device 1712 includes at least one processing unit 1716 and memory 1718. Depending on the exact configuration and type of computing device, memory 1718 may be volatile, such as RAM, non-volatile, such as ROM, flash memory, etc., or a combination of the two. This configuration is illustrated in FIG. 17 by dashed line 1714.

In other aspects, the computing device 1712 includes additional features or functionality. For example, the computing device 1712 may include additional storage such as removable storage or non-removable storage, including, but not limited to, magnetic storage, optical storage, etc. Such additional storage is illustrated in FIG. 17 by storage 1720. In one aspect, computer readable instructions to implement one aspect provided herein are in storage 1720. Storage 1720 may store other computer readable instructions to implement an operating system, an application program, etc. Computer readable instructions may be loaded in memory 1718 for execution by the at least one processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1712. Any such computer storage media is part of the computing device 1712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1712 includes input device(s) 1724 such as keyboard, mouse, pen, voice input device, touch input device, infrared cameras, video input devices, or any other input device. Output device(s) 1722 such as one or more displays, speakers, printers, or any other output device may be included with the computing device 1712. Input device(s) 1724 and output device(s) 1722 may be connected to the computing device 1712 via a wired connection, wireless connection, or any combination thereof. In one aspect, an input device or an output device from another computing device may be used as input device(s) 1724 or output device(s) 1722 for the computing device 1712. The computing device 1712 may include communication connection(s) 1726 to facilitate communications with one or more other devices 1730, such as through network 1728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A heat exchanger for a fuel cell power plant system, comprising:
    a first loop, wherein a first coolant is passed through:
        a fuel cell stack;
        a thermostat;
        a first portion of a first plate of the heat exchanger; and
        a fuel cell pump;
    a second loop, wherein a second coolant is passed through
        a second portion of the first plate of the heat exchanger; and
    a third loop, wherein a third coolant is passed through:
        an area associated with circuitry;
        the fuel cell stack;
        an expansion tank; and
    a first portion of a second plate of the heat exchanger.

2. The heat exchanger for the fuel cell power plant system of claim 1, comprising a fourth loop, wherein the second coolant is passed through a second portion of the second plate of the heat exchanger.

3. The heat exchanger for the fuel cell power plant system of claim 2, wherein the first plate has a greater size than the second plate of the heat exchanger.

4. The heat exchanger for the fuel cell power plant system of claim 3, wherein the first coolant or the second coolant is water.

5. The heat exchanger for the fuel cell power plant system of claim 4, wherein the thermostat regulates a path of the first loop.

6. The heat exchanger for the fuel cell power plant system of claim 5, wherein if a temperature of the first coolant is above a threshold, the first loop includes the first portion of the first plate of the heat exchanger.

\* \* \* \* \*